US008531829B2

(12) United States Patent
Oberpriller et al.

(10) Patent No.: US 8,531,829 B2
(45) Date of Patent: Sep. 10, 2013

(54) QUICK MOUNT SYSTEM FOR COMPUTER TERMINAL

(75) Inventors: Mark Oberpriller, Atlanta, GA (US); Robert Bullard, Atlanta, GA (US); Khalid Kidari, Norcross, GA (US)

(73) Assignee: EMS Technologies, Inc., Norcross, GA (US)

( * ) Notice: Subject to any disclaimer, the term of this patent is extended or adjusted under 35 U.S.C. 154(b) by 385 days.

(21) Appl. No.: 12/983,603

(22) Filed: Jan. 3, 2011

(65) Prior Publication Data
US 2012/0170203 A1 Jul. 5, 2012

(51) Int. Cl.
G06F 1/16 (2006.01)

(52) U.S. Cl.
USPC ..................................... 361/679.41

(58) Field of Classification Search
USPC ..................................... 361/679.41
See application file for complete search history.

(56) References Cited

U.S. PATENT DOCUMENTS

| | | | | |
|---|---|---|---|---|
| 5,227,953 | A | * | 7/1993 | Lindberg et al. ......... 361/679.41 |
| 5,408,382 | A | * | 4/1995 | Schultz et al. ........... 361/679.41 |
| 5,555,491 | A | * | 9/1996 | Tao ............................ 361/679.43 |
| 5,633,782 | A | * | 5/1997 | Goodman et al. ....... 361/679.41 |
| 5,729,250 | A | | 3/1998 | Bishop et al. |
| 5,751,548 | A | * | 5/1998 | Hall et al. ................ 361/679.41 |
| 5,805,412 | A | * | 9/1998 | Yanagisawa et al. .... 361/679.41 |
| 5,859,762 | A | * | 1/1999 | Clark et al. .............. 361/679.41 |
| 5,882,220 | A | * | 3/1999 | Horii et al. .................... 439/297 |
| 6,031,524 | A | | 2/2000 | Kunert |
| 6,046,571 | A | * | 4/2000 | Bovio et al. .................. 320/113 |
| 6,093,039 | A | * | 7/2000 | Lord .............................. 439/155 |
| 6,108,200 | A | * | 8/2000 | Fullerton .................. 361/679.12 |
| 6,113,047 | A | * | 9/2000 | Wung et al. ................. 248/284.1 |
| 6,151,218 | A | * | 11/2000 | Pirdy et al. ..................... 361/727 |
| 6,208,508 | B1 | * | 3/2001 | Ruch et al. ............... 361/679.55 |
| 6,353,536 | B1 | * | 3/2002 | Nakamura et al. ....... 361/679.41 |
| 6,366,458 | B1 | * | 4/2002 | Yoshida et al. .......... 361/679.41 |
| 6,386,413 | B1 | * | 5/2002 | Twyford ....................... 224/553 |
| 6,411,537 | B2 | * | 6/2002 | Helot ....................... 361/679.41 |
| 6,426,872 | B1 | * | 7/2002 | Sutton et al. ............ 361/679.41 |
| 6,483,698 | B1 | * | 11/2002 | Loh .......................... 361/679.41 |
| 6,744,627 | B2 | * | 6/2004 | Won et al. ................ 361/679.57 |

(Continued)

OTHER PUBLICATIONS

Intermec Product Profile for CV60 Vehicle Mount Computer, http://www.intermec.com/public-files/product/profiles/en/CV60_spec_web.pdf, Sep. 2007.

(Continued)

*Primary Examiner* — Lisa Lea Edmonds
(74) *Attorney, Agent, or Firm* — Heslin Rothenberg Farley & Mesiti P.C.

(57) ABSTRACT

A mounting system for quickly attaching and detaching a computer terminal from a mounting station. The mounting station can be semi-permanently attached to an object, such as on forklift or a non-mobile structure, such as a wall. The mounting station can include a power input port for receiving external power for the computer terminal and one or more communication ports for providing data communication between the computer terminal and another device. The computer terminal includes an electrical connector that engages an electrical connector of the mounting station to receive the supply power and facilitate the data communication between the computer terminal and other device. The computer terminal and/or the mounting station can include a locking mechanism that releasably couples the computer terminal to the mounting station such that the electrical connectors maintain proper contact.

20 Claims, 20 Drawing Sheets

(56) References Cited

U.S. PATENT DOCUMENTS

| | | | |
|---|---|---|---|
| 6,788,528 B2 * | 9/2004 | Enners et al. | 361/679.41 |
| 7,236,863 B2 * | 6/2007 | LaPorte et al. | 701/36 |
| 7,317,613 B2 * | 1/2008 | Quijano et al. | 361/679.41 |
| 7,381,079 B2 * | 6/2008 | Chuang | 439/352 |
| 7,506,843 B2 * | 3/2009 | McKelvey | 248/27.1 |
| 7,649,735 B2 * | 1/2010 | Iwaki | 361/679.41 |
| 7,909,394 B2 | 3/2011 | Richardson et al. | |
| 7,911,779 B1 * | 3/2011 | Tarnoff | 361/679.43 |
| 7,978,466 B2 * | 7/2011 | Lewandowski et al. | 361/679.41 |
| 8,098,488 B2 * | 1/2012 | Lewandowski et al. | 361/679.41 |
| 8,179,672 B2 * | 5/2012 | Carnevali | 361/679.41 |
| 8,217,908 B2 | 7/2012 | Gray | |
| 8,325,476 B2 * | 12/2012 | Huang et al. | 361/679.41 |
| 2002/0126102 A1 | 9/2002 | Redmayne | |
| 2003/0132288 A1 | 7/2003 | Fulcher et al. | |
| 2004/0057199 A1 * | 3/2004 | Azuchi | 361/683 |
| 2006/0114245 A1 | 6/2006 | Masters et al. | |
| 2006/0178781 A1 | 8/2006 | Simon et al. | |
| 2006/0217845 A1 | 9/2006 | Simon et al. | |
| 2008/0309865 A1 | 12/2008 | Sugita et al. | |
| 2009/0009945 A1 | 1/2009 | Johnson et al. | |
| 2009/0196124 A1 | 8/2009 | Mooring | |
| 2010/0085694 A1 * | 4/2010 | Nielsen et al. | 361/679.08 |
| 2010/0094132 A1 | 4/2010 | Hansen et al. | |
| 2010/0101854 A1 | 4/2010 | Wallaert et al. | |
| 2010/0156842 A1 | 6/2010 | Cherif | |
| 2010/0271324 A1 | 10/2010 | Hayes | |
| 2010/0315348 A1 | 12/2010 | Jellicoe et al. | |
| 2010/0328223 A1 | 12/2010 | Mockarram-Dori et al. | |
| 2011/0187832 A1 | 8/2011 | Yoshida | |
| 2012/0169614 A1 * | 7/2012 | Oberpriller et al. | 345/173 |

OTHER PUBLICATIONS

Office Action in U.S. Appl. No. 12/983,607, dated Dec. 6, 2012, 19 pages.

Office Action in U.S. Appl. No. 12/983,607, dated May 23, 2013, 26 pages.

* cited by examiner

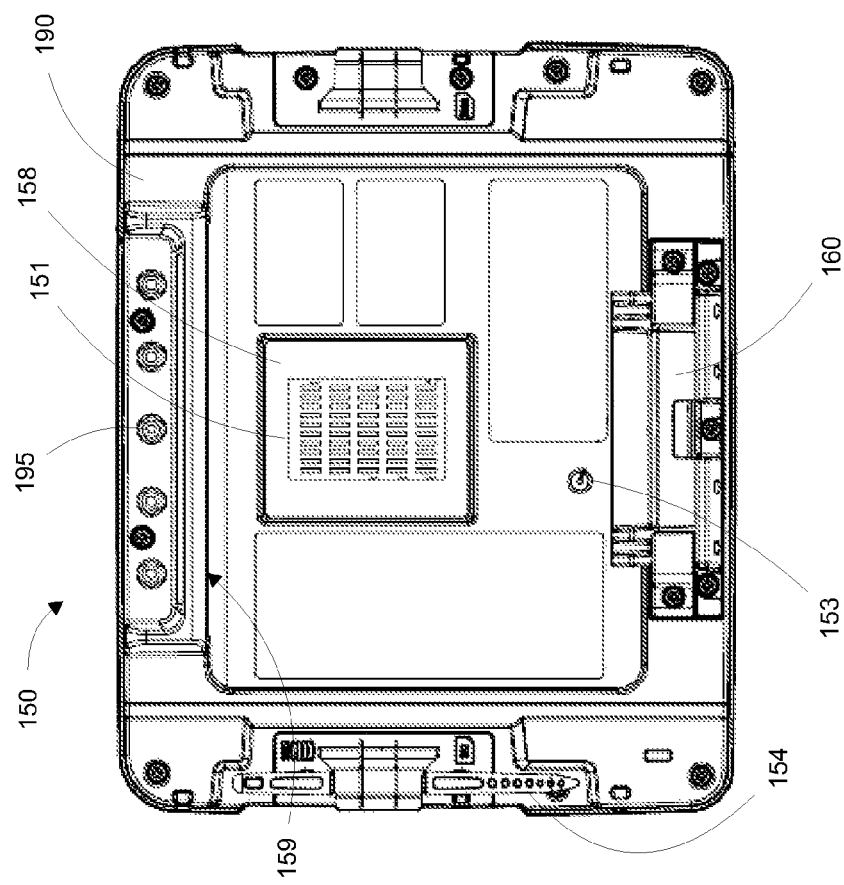
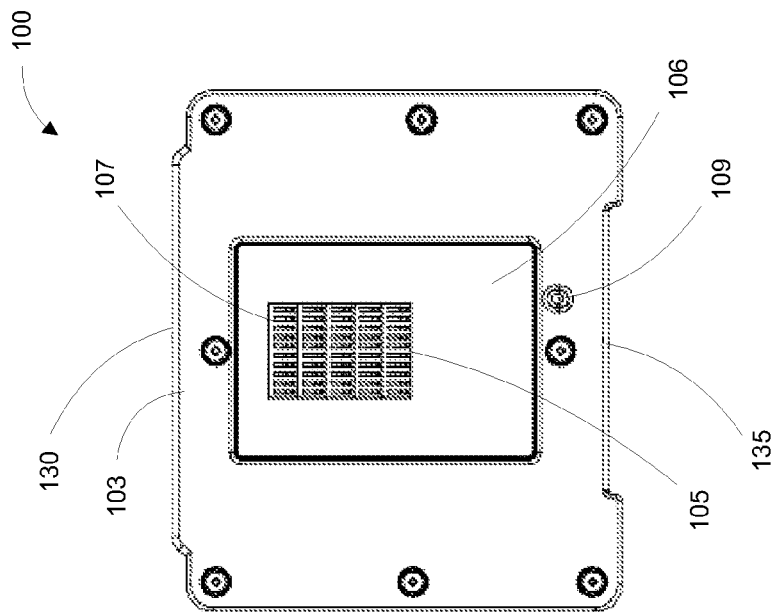
Fig. 3
Fig. 4

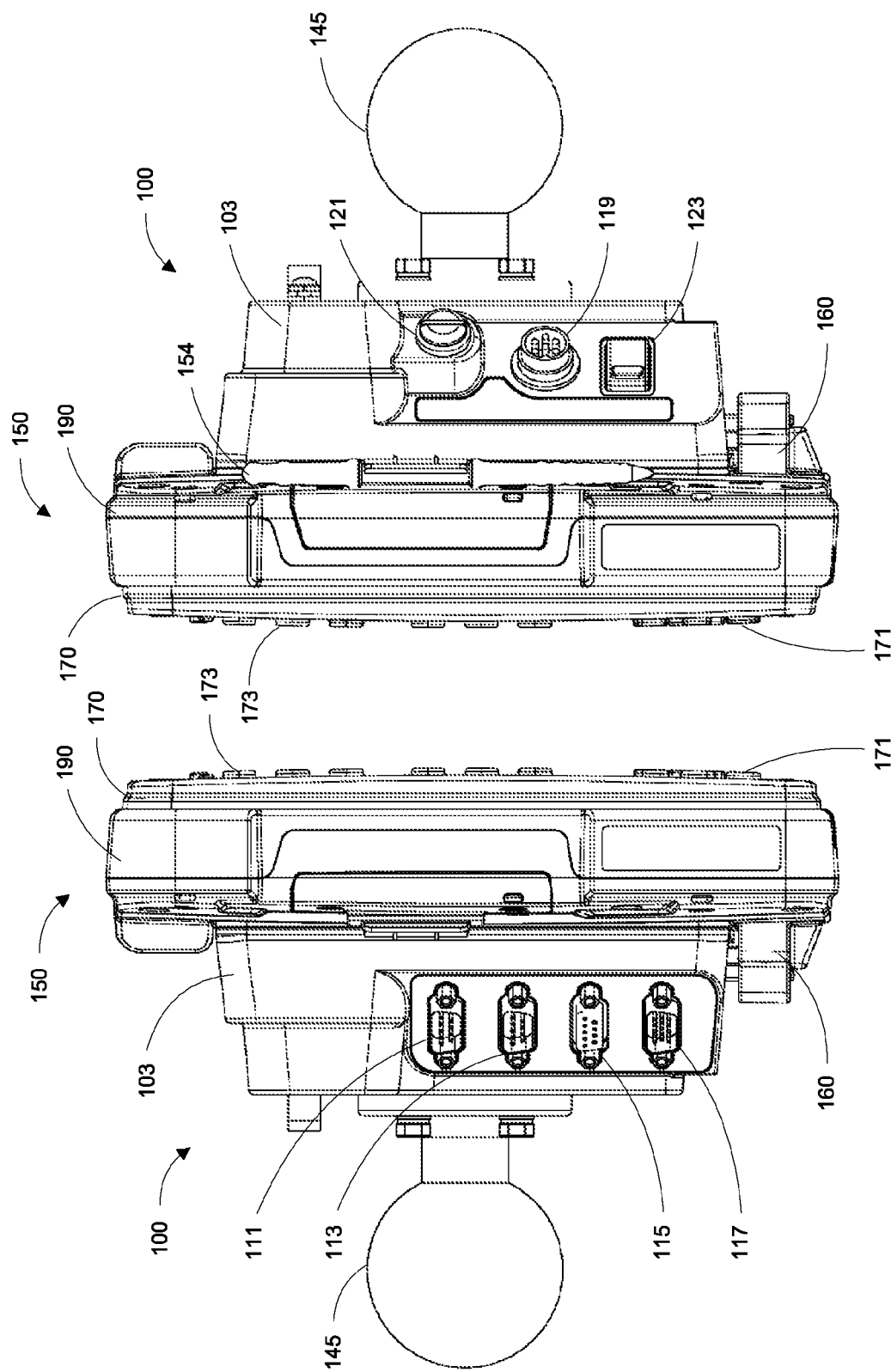

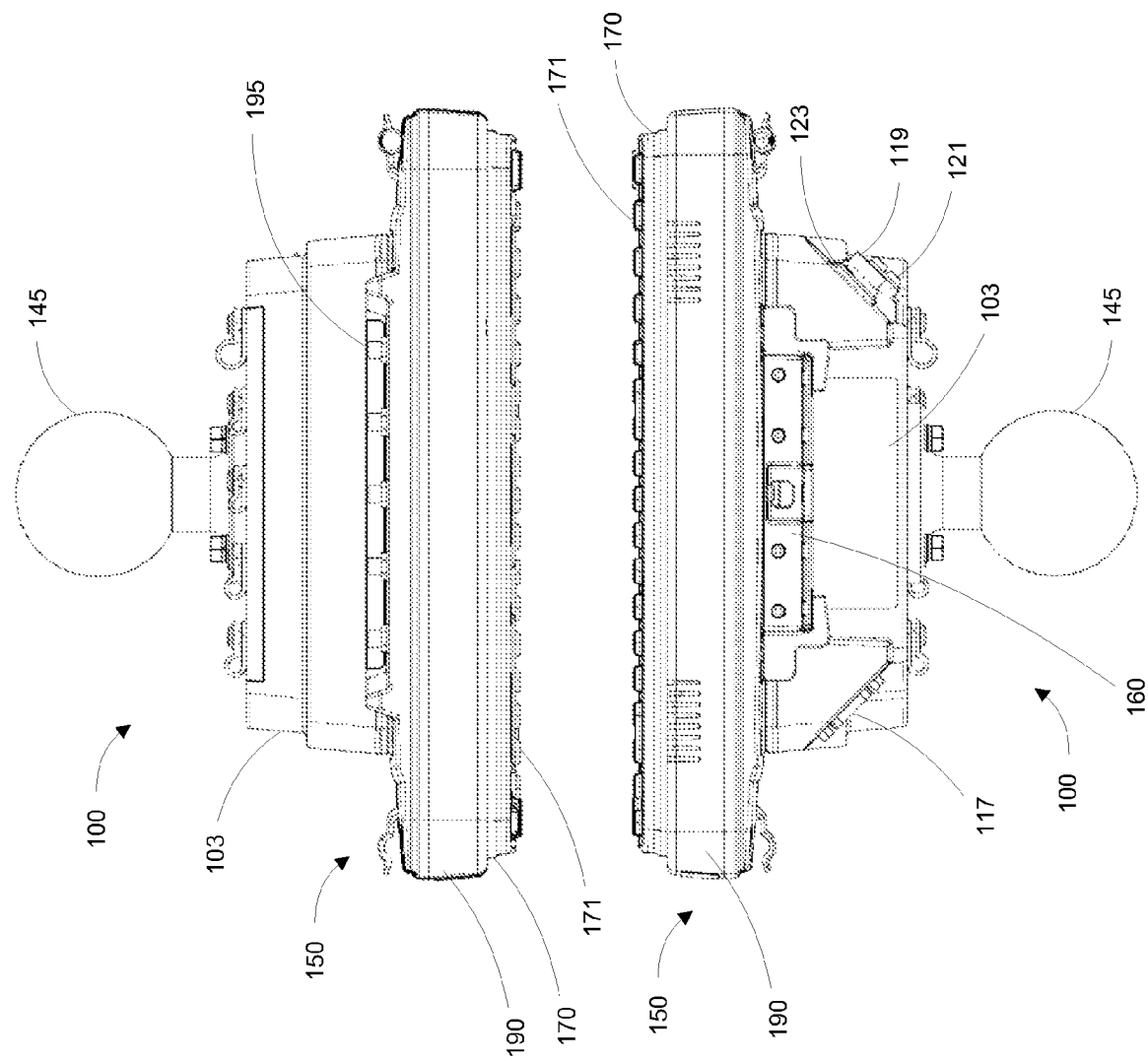

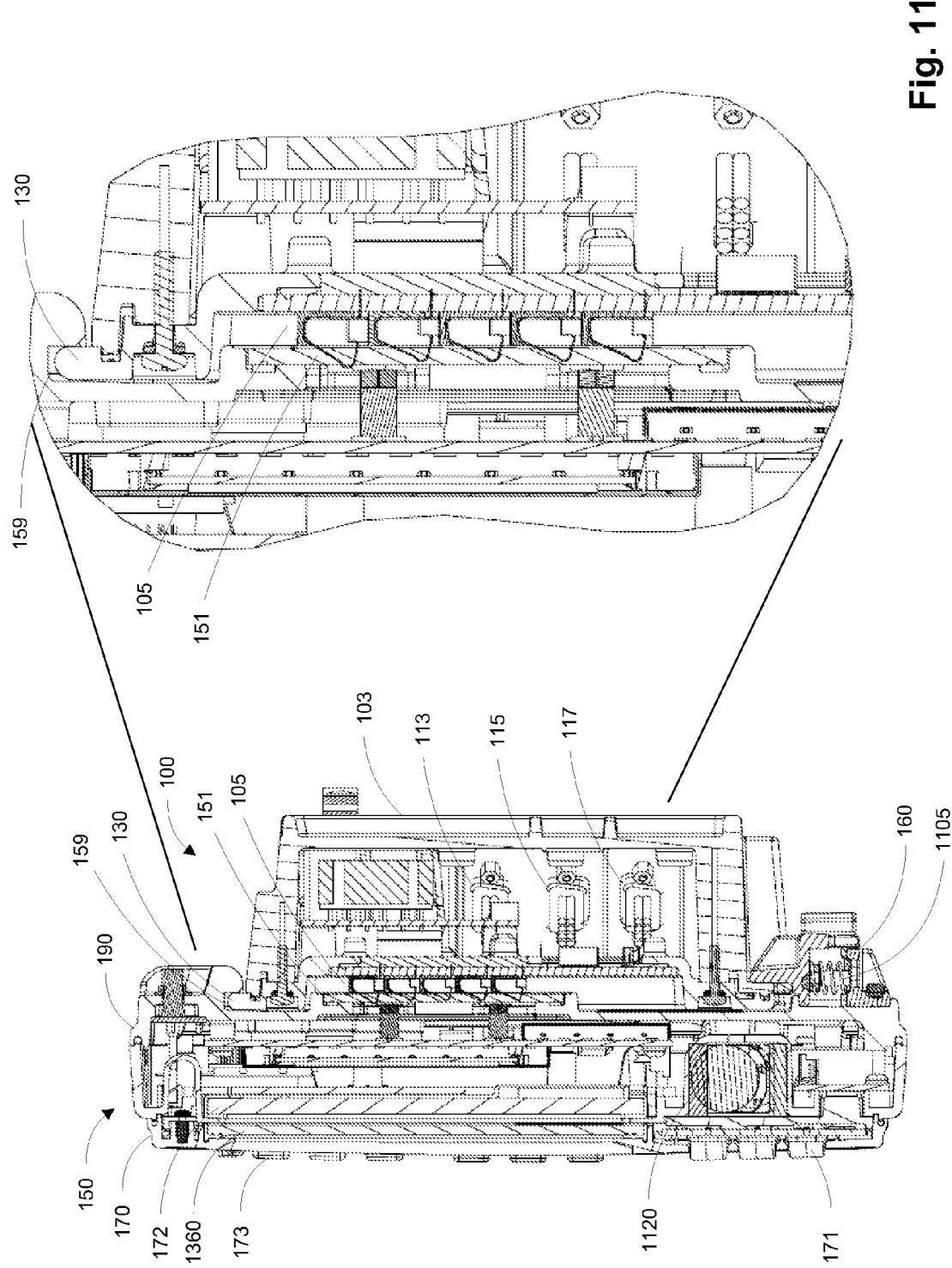

QUICK MOUNT SYSTEM FOR COMPUTER TERMINAL

RELATED PATENT APPLICATIONS

This application is related to U.S. patent application Ser. No. 12/983,607, entitled "Computer Terminal with User Replaceable Front Panel," filed on the same date as this application. The entire contents of the foregoing related application are hereby fully incorporated herein by reference.

TECHNICAL FIELD

The invention relates generally to computer systems, and more particularly to a mounting system that supports quick installation and removal of a computer terminal from a mounting station.

BACKGROUND

Computer terminals are often deployed in warehouses, manufacturing facilities, shop floors, outdoors, and other harsh usage environments to collect and display data. These computer terminals are typically designed with certain features, such as a waterproof housing that houses electrical components of the computer terminal, to reliably operate in the harsh environments and to provide a controlled environment for the installed electronics. However, even these rugged computer terminals are susceptible to failure that is often caused by the environment or by an operator.

Conventional computer terminals are generally constructed as a single, integrated unit, such that the electrical components are housed in a single protective environment. Thus, when the computer terminal fails or experiences damage, the entire computer terminal has to be taken out of service. When deployed in a warehouse or other commercial or industrial environment, computer terminals are often attached in a semi-permanent way to either a support structure, such as a wall, or to a vehicle, such as a forklift or other utility vehicle. In addition, electrical wires are often connected between the computer terminal and a power source and/or peripheral devices, such as a bar code scanner in a warehouse application. Replacement of such computer terminals often requires a skilled technician rather than a general laborer. The replacement of a semi-permanently installed computer terminal also requires a significant amount of time. If a computer terminal is attached to a vehicle, this can render the vehicle inoperable for its intended use until the failed or damaged computer terminal is replaced, leading to additional losses in productivity.

Accordingly, a need exists in the art for an improved mounting system that supports quicker and simpler installation, removal, and replacement of a computer terminal.

SUMMARY

The present invention provides a computer mounting system that facilitates a simpler installation, removal, and replacement of a computer terminal. A mounting station for holding a computer terminal can be securely coupled to another device, such as a wall or a swing arm of a vehicle. The mounting station can include ports for receiving power for the computer terminal and for receiving data communication cables connected at the other end to another device, such as another computer or a bar code scanner. The mounting station can include an electrical connector that engages an electrical connector of the computer terminal to route the supply power to the computer terminal and to route data between the computer terminal and other devices connected to the mounting station. The mounting station and the computer terminal can include housing configured such that the electrical connectors make proper contact when the computer terminal is held by the mounting station. The computer terminal and/or the mounting station can include one or more attachment mechanisms for securely and releasably attaching the computer terminal to the mounting station.

In one aspect of the present invention, a mounting station for releasably holding a computer terminal can include a housing comprising a first surface, a second surface, and an attachment mechanism disposed on the first surface for attaching the mounting station to a structure. A power input port can be disposed along the housing for receiving supply power for the computer terminal. An electrical connector electrically can be coupled to the power input port. The electrical conductor can include electrically conductive members disposed in an indentation of the second surface. The indentation can receive a raised surface of the computer terminal. The indentation can include electrically conductive elements. A tab can be disposed along an upper edge of the second surface for engaging a slot disposed on an upper surface of the computer terminal to align each electrically conductive member with a respective electrically conductive element. A ridge can be disposed along a lower edge of the second surface for engaging a locking mechanism of the computer terminal to securely attach the computer terminal to the mounting station. Each electrical conductive member can contact the respective electrically conducive element when the computer terminal is properly attached to the mounting station.

For another aspect of the present invention, a computer terminal can include a housing having a front surface and a rear surface. An attachment mechanism can be disposed on the rear surface for releasably attaching the computer terminal to a mounting station. A front panel can be disposed on the front surface and include a display. A processor can be disposed within the housing and logically coupled to the display. An electrical connector can include electrically conductive elements logically coupled to the processor and disposed on a raised area of the rear surface for engaging an indentation of the mounting station having electrically conductive elements. The attachment mechanism is operable to attach the computer terminal to the mounting station such that each of the electrically conductive elements contacts a corresponding electrically conductive member of the mounting station.

For yet another aspect of the present invention, a system can include a mounting station for releasably holding a computer terminal and providing supply power to the computer terminal. The mounting station can include a first housing having a first surface, a second surface, and an attachment mechanism for attaching the mounting station to another object. The mounting station also can include a power input port disposed along the first housing for receiving supply power for the computer terminal. A first electrical connector can be electrically coupled to the power input port and include electrically conductive members disposed in an indentation of the second surface. A tab can extend from an upper edge of the second surface. A ridge can be disposed along a lower edge of the second surface. The computer terminal can include a second housing having a front surface and a rear surface. An attachment mechanism can be disposed on the rear surface for releasably engaging the ridge. A front panel can be disposed on the front surface and include a display. A processor can be disposed within the second housing and logically coupled to the display. A second electrical connector can include electrically conductive elements logically coupled to the processor and disposed on a raised area of the rear surface for engaging the indentation. The computer terminal can also include a slot for receiving the tab. Each electrical conductive member can contact a corresponding electrical conductive element when the computer terminal is attached to the mounting station.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which:

FIG. 3 is a rear elevation view of the computer terminal of FIG. 1, in accordance with certain exemplary embodiments;

FIG. 4 is an elevation view of the mounting station of FIG. 1, in accordance with certain exemplary embodiments;

FIG. 7 is a side elevation view of the computer terminal of FIG. 1 attached to the mounting station of FIG. 1, in accordance with certain exemplary embodiments;

FIG. 8 is a side elevation view of the computer terminal of FIG. 1 attached to the mounting station of FIG. 1, in accordance with certain exemplary embodiments;

FIG. 9 is a top elevation view of the computer terminal of FIG. 1 attached to the mounting station of FIG. 1, in accordance with certain exemplary embodiments;

FIG. 10 is a bottom elevation view of the computer terminal of FIG. 1 attached to the mounting station of FIG. 1, in accordance with certain exemplary embodiments;

FIG. 11 is a cross sectional view of portions of the computer terminal and the mounting station of FIG. 1 with the computer terminal attached to the mounting station, in accordance with certain exemplary embodiments;

Figure 1:
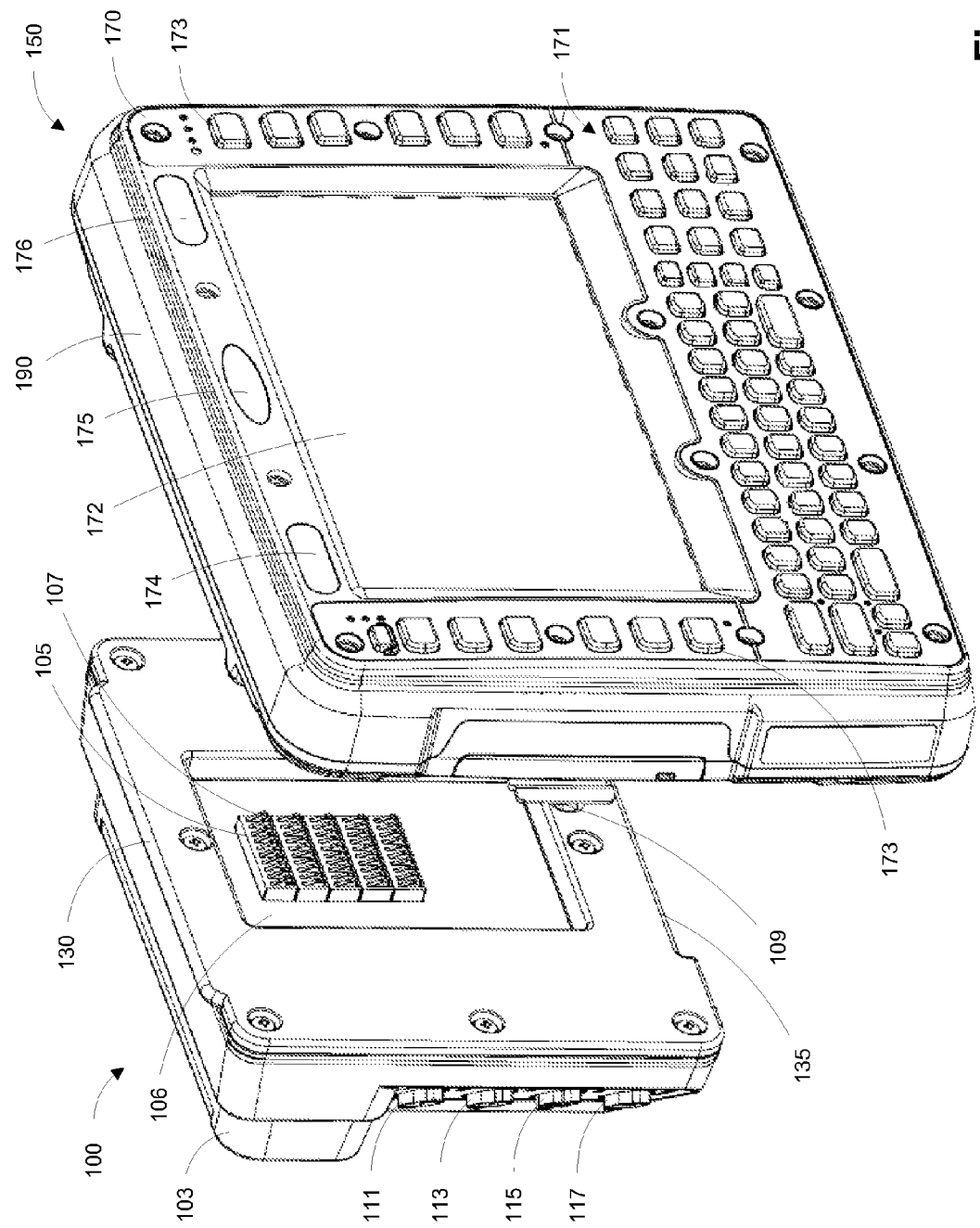
FIG. 1 is a perspective view of a mounting station and a computer terminal removably attachable to the mounting station, in accordance with certain exemplary embodiments.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles.

DETAILED DESCRIPTION OF EXEMPLARY EMBODIMENTS

The following description of exemplary embodiments refers to the attached drawings. Any spatial references herein such as, for example, "upper," "lower," "above," "below," "rear," "between," "vertical," "angular," "beneath," etc., are for the purpose of illustration only and do not limit the specific orientation or location of the described structure.

Figure 2:
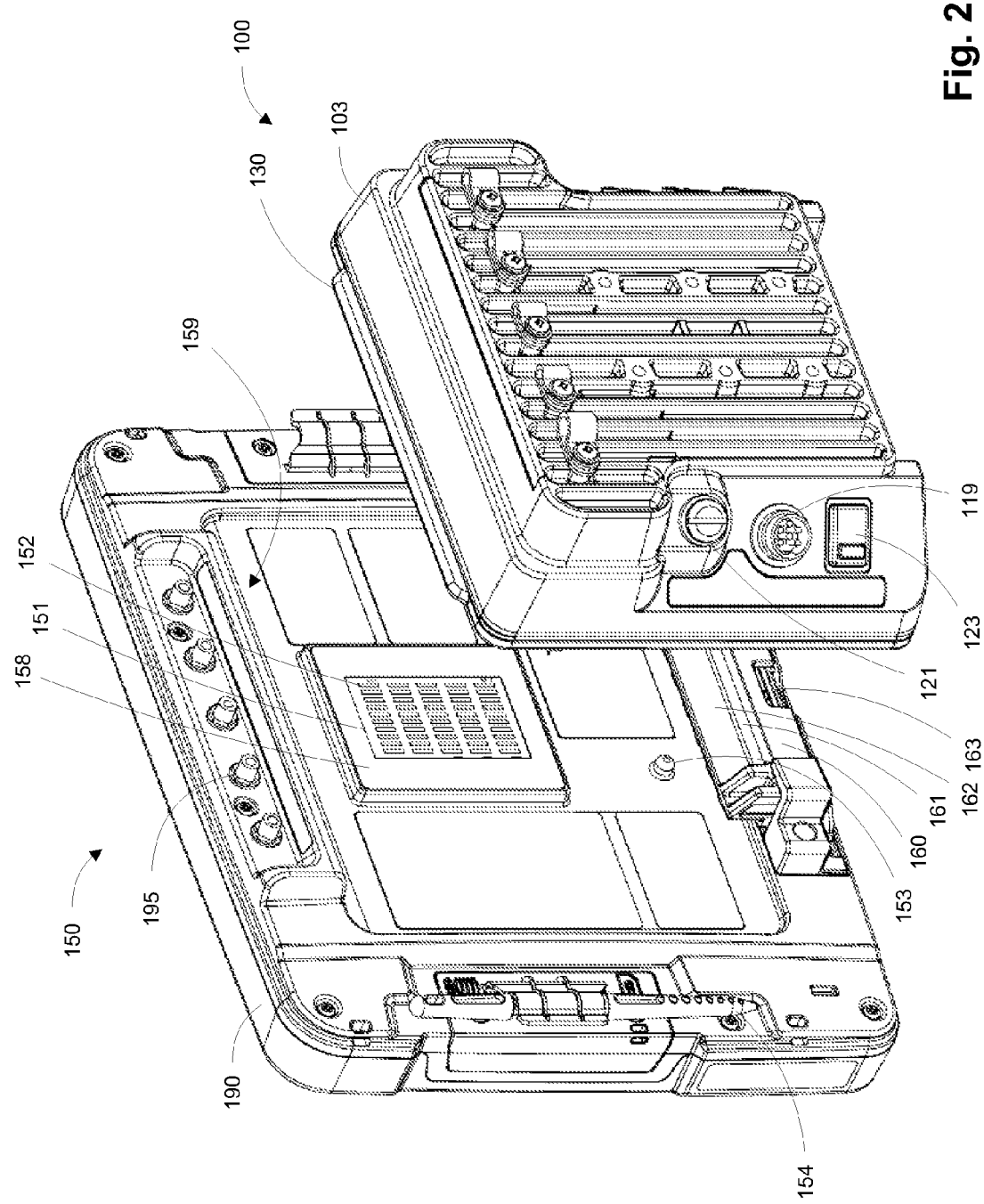
FIG. 2 is a perspective view of the mounting station and the computer terminal of FIG. 1, in accordance with certain exemplary embodiments.
Figure 5:
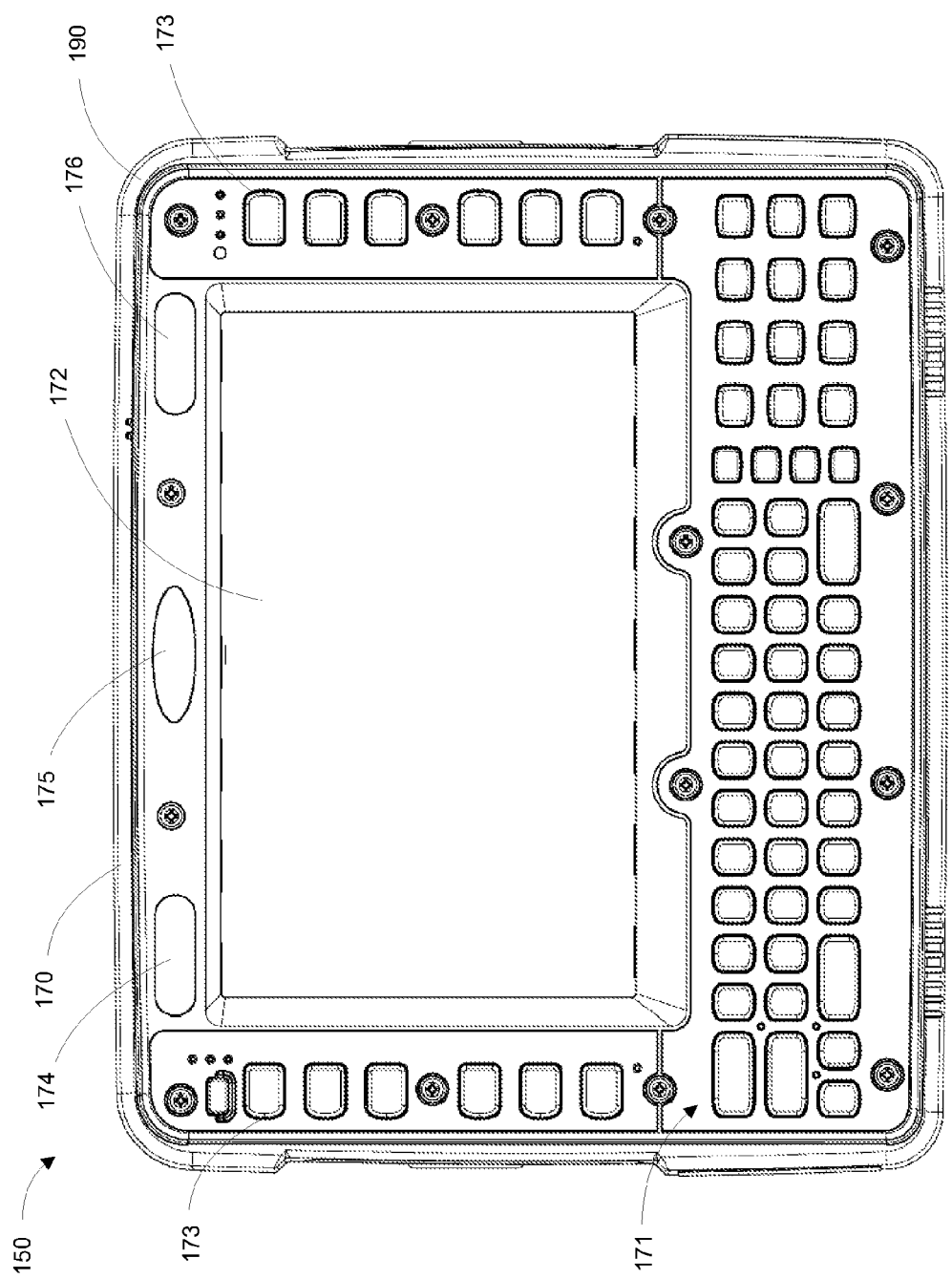
FIG. 5 is a front elevation view of the computer terminal of FIG. 1, in accordance with certain exemplary embodiments.
Figure 6:
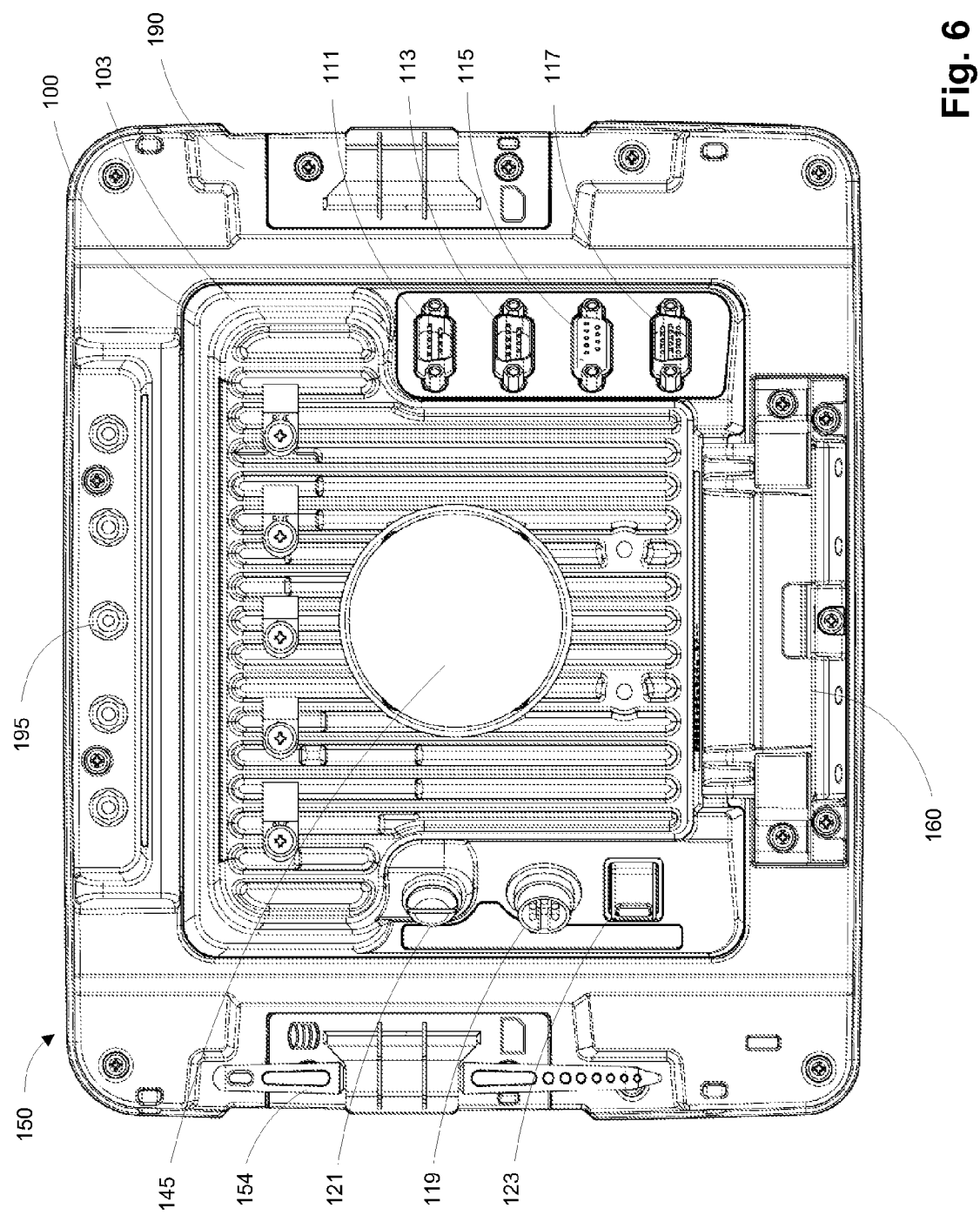
FIG. 6 is a rear elevation view of the computer terminal of FIG. 1 attached to the mounting station of FIG. 1, in accordance with certain exemplary embodiments.
Figure 12:
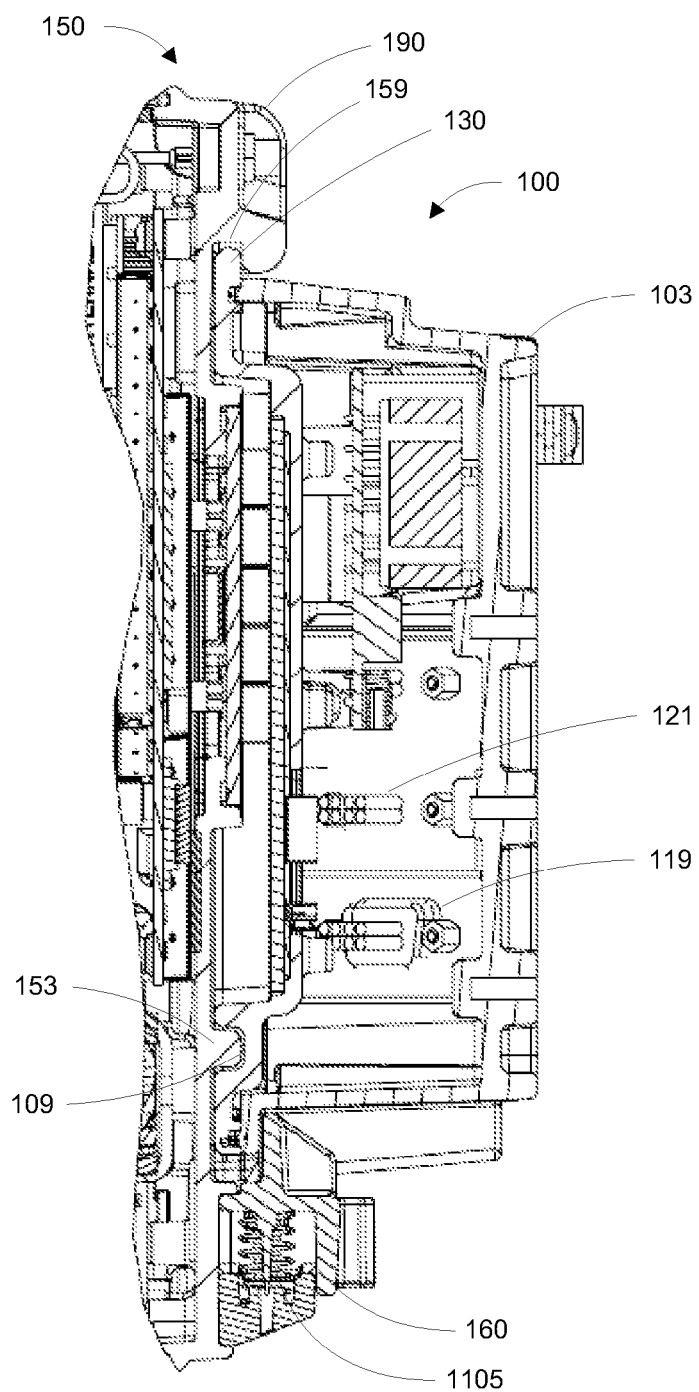
FIG. 12 is a cross sectional view of portions of the computer terminal and the mounting station of FIG. 1 with the computer terminal attached to the mounting station, in accordance with certain exemplary embodiments.

Referring now to the figures, in which like numerals represent like (but not necessarily identical) elements throughout the figures, exemplary embodiments of the present invention are described in detail. FIGS. 1-12 depict an exemplary mounting station 100 and a computer terminal 150 removably attachable to the mounting station 100. In particular, FIGS. 1-2 are perspective views of the mounting station 100 and the computer terminal 150 with the computer terminal 150 detached from the mounting station 100; FIG. 3 is a rear elevation view of the computer terminal 150; FIG. 4 is an elevation view of the mounting station 100; FIGS. 5-10 are elevation views of the computer terminal 150 and the mounting station 100 with the computer terminal 150 attached to the mounting station 100; and FIGS. 11 and 12 are cross-sectional views of portions of the computer terminal 150 and the mounting station 100.

Referring to FIGS. 1-12, computer terminals 150 are often used in warehouses, manufacturing facilities, shop floors, outdoors, and other applications to collect and display data. The exemplary computer terminal 150 and mounting station 100 enable a user to quickly and easily attach and detach the computer terminal 150 from the mounting station 100, for example if the computer terminal 150 is damaged. In a typical application, the mounting station 100 is attached in a semi-permanent manner to a vehicle, such as a forklift, utility truck, lift truck or other type of vehicle, or to a non-mobile structure, such as a wall, column, conduit, or pedestal. As best seen in FIGS. 6-10, the mounting station 100 includes a ball-shaped coupler 145 that can be removably installed in a socket coupler. In one example, the ball-shaped coupler 145 can be attached to a socket coupler of a swing arm attached to a forklift. The swing arm can be moved relative to the forklift to position the mounting station 100 and thus, the computer terminal 150 attached to the mounting station 100, based on user preference. One of ordinary skill in the art having the benefit of the present disclosure would appreciate that the ball-shaped coupler 145 is only one of many mechanisms that can used to attach the mounting station 100 to another object.

The exemplary mounting station 100 includes a housing 103 that protects internal components from the environment. In certain exemplary embodiments, the housing 103 includes a waterproof and/or dustproof housing that prevents water (or dust) from entering the housing 103 and damaging the internal components. The housing 103 and certain exemplary internal components of the mounting station 100 are discussed in further detail below in connection with FIGS. 14 and 15.

The exemplary mounting station 100 also includes a power input port 119 disposed on a side of the housing 103 for receiving a power cable and for providing power to the computer terminal 150. The mounting station 100 also includes a power switch 123 for selectively providing power from the power input port 119 to the computer terminal 150 and a replaceable fuse 121 that limits damage to the external source of power, the mounting station 100, and the computer terminal 150 in case of electrical failure. Supply power is routed from the power input port 119 to an electrical connector 105 via the power switch 123, the fuse 121, and one or more electrical conductors. As discussed in further detail below, electrically conductive pins 107 of the connector 105 contact electrically conductive surfaces 152 of a printed circuit board 151 disposed on the computer terminal 150 to provide supply power to the computer terminal 150 when the computer terminal 150 is attached to the mounting station 100.

The mounting station 100 also includes several data communication ports, each for receiving a communication cable. In particular, the exemplary mounting station 100 includes two serial communication ports 111, 113, a universal serial bus ("USB") port 115, and a controller area network ("CAN") bus and audio port 117. In certain alternative exemplary embodiments, one or more of the communication ports 111-117 may be excluded or other types of data communication ports may be included with the mounting station 100. Data is routed between each communication port 111-117 (and devices connected to the communication ports 111-117) and the computer terminal 150 via the electrical connector 105 and the printed circuit board 151 of the computer terminal 150. As discussed in further detail in connection with FIGS. 14 and 15, one or more electrical conductors or cables connect each communication port 111-117 to the electrical connector 105. Peripheral devices, such as bar code scanners, can be connected to the computer terminal 150 via the communication ports 111-117. Throughout the discussion of exemplary embodiments, it should be understood that the terms "data" and "information" are used interchangeably herein to refer to text, images, audio, video, or any other form of information that can exist in a computer-based environment.

The power input port 119 and the communication ports 111-117 are advantageously located on the mounting station 100 rather than the computer terminal 150 to support simpler and quicker replacement of the computer terminal 150. As the power supply cable and the communication cables are attached to the mounting station 100 rather than the computer terminal 150, these cables can remain connected during computer terminal replacement. This is particularly advantageous for entities that require an electrician or other skilled laborer to connect and disconnect electrical wiring. As the cables are left connected, a general or unskilled laborer can attach and detach the computer terminal 150 from the mounting station 100. This also leads to quicker installation and replacement times as less steps are needed to complete the installation or replacement of the computer terminal 150.

In the illustrated embodiment, the components 111-123 are disposed on a side of the housing 103 away from the ball-shaped coupler 145 and away from the side of the housing 103 that receives the computer terminal 150. This location for the components 111-123 enables the mounting station 100 to be installed on a swing arm without limiting the swing arm's range of motion by the electrical cables connected to the mounting station 100. Having the components 111-123 disposed at an angle with respect to the side of the housing 103 also supports increased range of motion of a swing arm.

The exemplary computer terminal 150 includes a housing 190 that protects internal components from the environment. In certain exemplary embodiments, the housing 190 includes a waterproof and/or dustproof housing that prevents water (or dust) from entering the housing 190 and damaging the internal components. The computer terminal 150 also includes a front panel 170 disposed on the front of the housing 190. In certain exemplary embodiments, the front panel 170 is removable from the computer terminal 150, as discussed in further detail below in connection with FIGS. 17-21.

Figure 13:
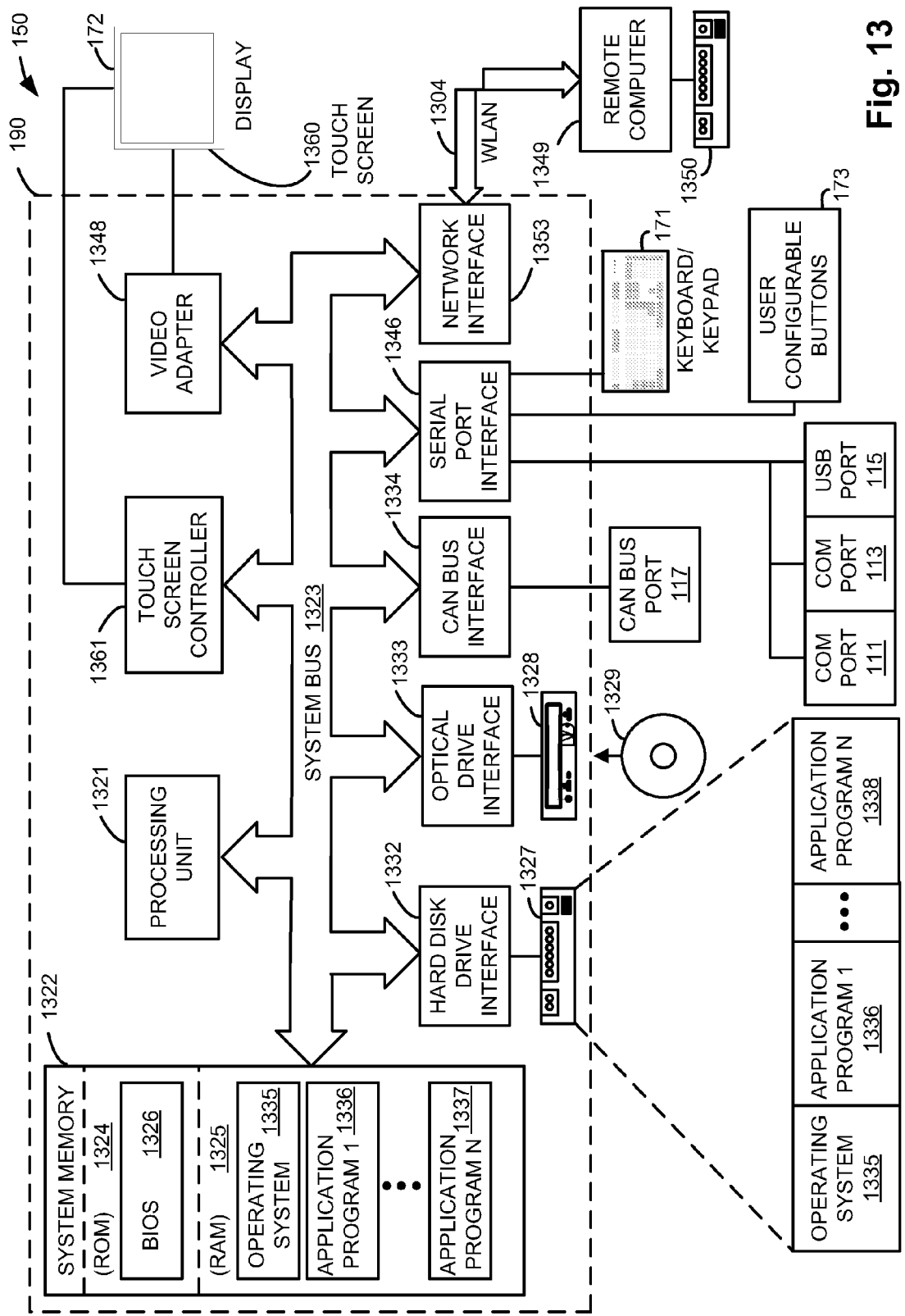
FIG. 13 is a block diagram depicting components of the computer terminal of FIG. 1, in accordance with certain exemplary embodiments.

The computer terminal 150 also includes a display 172 having a display screen visible through the front panel 170. For example, the display 172 may include a liquid crystal display ("LCD") or a display having a touch sensitive screen 1360 (FIG. 13). The front panel 170 includes a keyboard or keypad 171 and user configurable keys 173. A user can use the keypad 171, user configurable keys 173 and touch sensitive screen 1360 to enter commands and data to the computer terminal 150. The computer terminal 150 also includes a stylus 154 removably attached to the housing 190. A user can use the stylus 154 to interact with the touch sensitive screen.

The front panel 170 also includes several labels 174-176 disposed near the top of the front panel 170. These labels 174-176 can be used to display brand names, company names, or any other information. As the computer terminal 150 is removable from the mounting station 100, the computer terminals 150 can be rebranded with different labels 174-176 for different customers while providing the same or similar mounting stations 100 to the customers. For example, two different customers may order the same models of computer terminal 150 and mounting station 100. Both customers can receive the same mounting station 100 and the same computer terminals 150, but having different labels 174-176 on the computer terminals 150.

The computer terminal 150 also includes several connectors 195 for connecting to external antennas. For example, one or more of Wi-Fi, global positioning system ("GPS"), and Mobile Net antennas may be connected to the computer terminal 150 via the connectors 195. In certain exemplary embodiments, the connectors 195 are female SubMiniature version A ("SMA") connectors or another type of radio frequency ("RF") connector. In certain alternative embodiments, one or more of the connectors 195 are disposed on the mounting station 100. In such an embodiment, data may be routed between the connectors 195 and the computer terminal 150 via the electrical connector 105, the printed circuit board 151, and one or more electrical conductors.

FIG. 13 is a block diagram depicting components of the computer terminal 150, in accordance with certain exemplary embodiments. In particular, FIG. 13 illustrates certain electronic components disposed inside the housing 190 and their connections to the other components of the computer terminal 150 discussed above. Referring to FIG. 13, the computer terminal 150 includes a processing unit 1321, a system memory 1322, and a system bus 1323 that couples various system components, including the system memory 1322, to the processing unit 1321. The system bus 1323 can include any of several types of bus structures, including a memory bus or memory controller, a peripheral bus, or a local bus, using any of a variety of bus architectures. The system memory 1322 includes a read-only memory ("ROM") 1324 and a random access memory ("RAM") 1325. A basic input/output system ("BIOS") 1326 containing the basic routines that help to transfer information between elements within the computer terminal 150, such as during start-up, is stored in the ROM 1324.

The computer terminal 150 also includes a hard disk drive 1327 for reading from and writing to a hard disk (not shown) and an optical disk drive 1328 for reading from or writing to a removable optical disk 1329 such as a CD-ROM, compact disk-read/write ("CD/RW"), DVD, or other optical media. The hard disk drive 1327 and optical disk drive 1328 are connected to the system bus 1323 by a hard disk drive interface 1332 and an optical disk drive interface 1333, respectively. Although the exemplary computer terminal 150 employs a ROM 1324, a RAM 1325, a hard disk drive 1327, and a removable optical disk 1329, it should be appreciated by a person of ordinary skill in the art having the benefit of the present disclosure that other types of computer readable media also can be used in the exemplary computer terminal 150. For example, the computer readable media can include any apparatus that can contain, store, communicate, propagate, or transport data for use by or in connection with one or more components of the computer terminal 150, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer readable media can provide nonvolatile storage of computer-executable instructions, data structures, program modules, and other data for the computer terminal 150.

A number of modules can be stored on the ROM 1324, RAM 1325, hard disk drive 1327 or optical disk 1329, including an operating system 1335 and various application modules 1336-1337. Application modules 1336-1337 can include routines, sub-routines, programs, objects, components, data structures, etc., which perform particular tasks or implement particular abstract data types. For example, the application module 1336 may be an inventory application for use in collecting and displaying inventory information in a warehouse.

A user can enter commands and information to the computer terminal 150 through the input devices, such as the keypad 171 and the user configurable keys 173. These and other input devices are often connected to the processing unit 1321 through a serial port interface 1346 that is coupled to the system bus 1323, but can be connected by other interfaces, such as a parallel port, game port, or the like. Also connected to the serial port interface 1346 (or another interface) are the communication ports 111, 113, and the USB port 115. The CAN bus and audio port 117 is connected to the processing unit 1321 through a CAN bus interface 1334 that is coupled to the system bus 1323.

The display 172 also can be connected to the system bus 1323 via an interface, such as a video adapter 1348, to receive content for display by the display 172. The exemplary display 172 incorporates a touch sensitive screen 1360 coupled to the processing unit 1321 by way of a touch screen controller 1361. For example, the touch sensitive screen 1360 can include resistive, capacitive, surface acoustic wave ("SAW"), infrared ("IR"), strain gauge, dispersive signal technology, acoustic pulse recognition, and optical touch sensing technology, as would be readily understood by a person of ordinary skill in the art having the benefit of the present disclosure. The touch screen controller 1361 can determine the location of a user's touch (e.g., with a finger, stylus, pen, or other object) on or near the touch sensitive screen 1360. In addition to the display 172, the computer terminal 150 can include other peripheral output devices, such as speakers (not shown).

Figure 23:
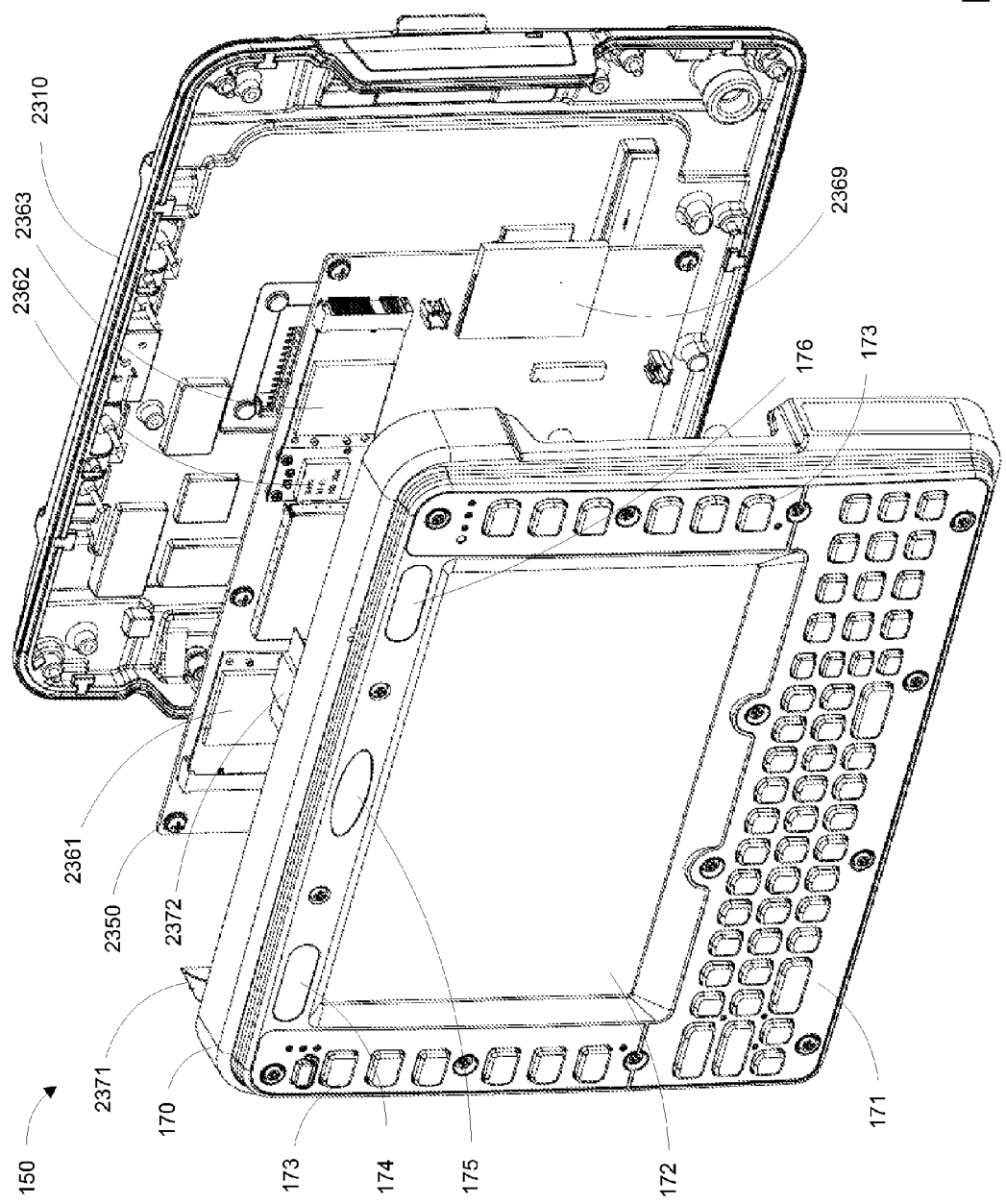
FIG. 23 is an exploded view of the computer terminal of FIG. 1, in accordance with certain exemplary embodiments.

The computer terminal 150 is configured to operate in a networked environment using logical connections to one or more remote computers 1349. The remote computer 1349 can be any network device, such as a personal computer, a server, a client, a router, a network PC, a peer device, or other device. While the remote computer 1349 typically includes many or all of the elements described above relative to the computer terminal 150, only a memory storage device 1350 has been illustrated in FIG. 13 for simplicity. The logical connection depicted in FIG. 13 includes a wireless local area network ("WLAN") 104 that the computer terminal 150 communicates with via a Wi-Fi antenna 2371 (FIG. 23). In certain alternative embodiments, the logical connection includes a wireless wide area network ("WWAN"). In a networked environment, program modules depicted relative to the computer terminal 150, or portions thereof, can be stored in the remote memory storage device 1350.

It will be appreciated that the network connection shown in FIG. 13 is exemplary and other means of establishing a communications link between the computers can be used. Moreover, those skilled in the art will appreciate that the computer terminal 150 illustrated in FIG. 13 can have any of several other suitable computer system configurations. For example, the computer terminal 150 may not include certain components, in alternative exemplary embodiments.

Referring back to FIGS. 1-12, the electrical connector 105 includes a multitude of electrically conductive pins 107. In this exemplary embodiment, the pins 107 are arranged in five rows of ten pins 107 each. However, any number of pins 107 and any number of arrangements of pins 107 can be used without departing from the scope and spirit of the present invention. The pins 107 are used, along with the conductive surfaces 152 of the printed circuit board 151, to provide an electrically conductive path between components of the mounting station 100 and components of the computer terminal 150. That is, certain components of the mounting station 100 are electrically connected to one or more of the pins 107. For example, the power input port 119 is connected to several pins 107 to provide power to the computer terminal 150. In addition, each of the communication ports 111-117 are connected to one or more of the pins 107 to communicate data between the respective communication port 111-117 (and the device connected to the communication port 111-117) and the computer terminal 150.

Each pin 107 contacts an electrically conductive surface 152 of the printed circuit board 151 when the computer terminal 150 is properly attached to the mounting station 100. Accordingly, the surfaces 152 are arranged similar to the pins 107 of the electrical connector 105. Each of the surfaces 152 are connected to an appropriate component of the computer terminal 150 via one or more electrical conductors and/or printed circuit board strip lines. For example, the CAN bus interface 1334 is connected to one or more of the conductive surfaces 152 that correspond to the pins 107 connected to the CAN bus and audio port 117. When the computer terminal 150 is properly attached to the mounting station 110, these surfaces 152 and pins 107 provide an electrical connection between the CAN bus interface 1334 and the CAN bus and audio port 117.

The pins 107 are configured to provide a force against the surfaces 152 when the computer terminal 150 is attached to the mounting station 100. In particular, the pins 152 are configured as leaf springs, or a folded piece of metal. By compressing a folded piece of metal, the natural tendency of the metal is to spring open. The spring force is controlled by the thickness, width, and type of metal used. The spring force ensures that the pins 107 maintain proper contact with the surfaces 152 even in harsh environments, such as heavy vibration. In certain exemplary embodiments, the total force generated by the pins 107 against the surfaces 152 is approximately 31.5 pounds.

The computer terminal 150 and the mounting station 100 are configured to support quick attachment and detachment of the computer terminal 150 from the mounting station 100, such that when the computer terminal 150 is attached to the mounting station 100, the pins 107 contact the appropriate surface 152. In particular, the computer terminal 150 includes a latch or slot 159 fabricated near the top of the rear side of the housing 190. As best seen in FIGS. 11 and 12, the slot 159 accepts a flange or tab 130 disposed at the top of the mounting station housing 103 when the computer terminal 150 is attached to the mounting station 100. The tab 130 fits into the slot 159 such that the electrical connector 105 is properly aligned with the printed circuit board 151 and thus, each pin 107 is properly aligned with the appropriate surface 152. In certain exemplary embodiments, the slot 159 has a width that substantially matches the width of the tab 130 such that the tab 130 fits tightly into the slot 159 widthwise. This slot 159 and tab 130 configuration helps to properly align the electrical connector 105 with the printed circuit board 151 during attachment of the computer terminal 150 to the mounting station 100.

The computer terminal 150 also includes a spring loaded locking mechanism 160 located near the bottom of the rear side of the housing 190. The exemplary locking mechanism 160 includes a member 161 having an angled surface 162. During the attachment of the computer terminal 150 to the mounting station 100, a bottom ridge 135 of the mounting station 100 contacts the angled surface 162 and presses the member 161 downward against a spring 1105 (FIG. 11) until the ridge 135 passes the member 161. After the ridge 135 passes the member 161, the spring 1105 pushes the member 161 upwards and locks the computer terminal 150 in place with the mounting station 100. The locking mechanism 160 holds the computer terminal 150 tightly with the mounting station 100 to ensure proper contact between the pins 107 and the surfaces 152.

As best seen in FIG. 1, the electrical connector 105 is disposed in a recessed area or indentation 106 of the housing 103. As best seen in FIG. 2, the printed circuit board 151 is disposed on a raised surface 158 of the housing 190. When the computer terminal 150 is attached to the mounting station 100, the raised surface 158 penetrates the indentation 106 so that the pins 107 properly contact the appropriate surface 152. In certain exemplary embodiments, the upper and side walls of the raised surface 158 fit tightly into the upper and side walls of the indentation 106 to provide a second alignment mechanism between the electrical connector 105 and the printed circuit board 151.

An alignment pin 153 is disposed on the rear surface of the computer terminal housing 190. The alignment pin 153 engages an alignment aperture 109 on the mounting station housing 103 and acts as a third alignment mechanism to ensure proper alignment of the electrical connector 105 with the printed circuit board 151. That is, when the computer terminal 150 is being attached to the mounting station 100, the alignment pin 153 penetrates the alignment aperture 109 to properly align the electrical connector 105 with the printed circuit board 151. In certain alternative exemplary embodiments, the alignment pin 153 is disposed on the mounting station housing 103 and the alignment aperture 109 is disposed on the rear surface of the computer terminal 150.

A user can quickly and easily attach the computer terminal 150 to the mounting station 100 such that the proper electrical connections are made between the electrical connector and the printed circuit board 151. The user holding the computer terminal 150 can first place the slot 159 properly over the tab 130. With the tab 130 properly disposed in the slot 159, the computer terminal 150 can suspend from the mounting station 100 without support from the user. The user can then press the bottom of the computer terminal 150 against the bottom of the mounting station 100 until the locking mechanism 160 locks into place to hold the ridge 135. At this point, the computer terminal 150 is properly attached to the mounting station 100 and the pins 107 make proper contact with the appropriate surface 152.

To remove the computer terminal 150 from the mounting station 100, a user can actuate a lever 163 on the locking mechanism 160 that forces the member 161 downward and releases the bottom portion of the computer terminal 150 from the mounting station 100. At this point, the computer terminal 150 is suspended from the mounting station 100 via the slot 159 and tab 130 connection. The computer terminal 150 can then be lifted upward to remove the tab 130 from the slot 159. Although not shown, in certain exemplary embodiments, the locking mechanism 160 can include an aperture for receiving a padlock or other security device. The padlock can be installed on the locking mechanism 160 when the computer terminal 150 is attached to the mounting station 100 to prevent unauthorized users from removing the computer terminal 150.

In certain exemplary embodiments, the power input port 119 is electrically coupled to pins 107 along the top row of pins 107 and the communication ports 111-117 are electrically coupled to pins 107 along the rows below the top row. This pin configuration enables the computer terminal 150 to receive supply power from the mounting station 100 prior to the communication ports 111-117 being connected to the computer terminal 150 when the computer terminal 150 is being attached to the mounting station 100. Similarly, when the computer terminal 150 is being detached from the mounting station 100, the connections between the communication ports 111-117 and the computer terminal 150 are disengaged prior to supply power being removed from the computer terminal 150.

Referring now to FIG. 11, the computer terminal 150 includes a battery 1120. The battery 1120 provides backup power to the processing unit 1321 and other components in the computer terminal 150, for example when external power is not available. For example, the battery 1120 can provide power to components of the computer terminal 150 while the computer terminal 150 is being moved from one mounting station 100 to another.

Figure 14:
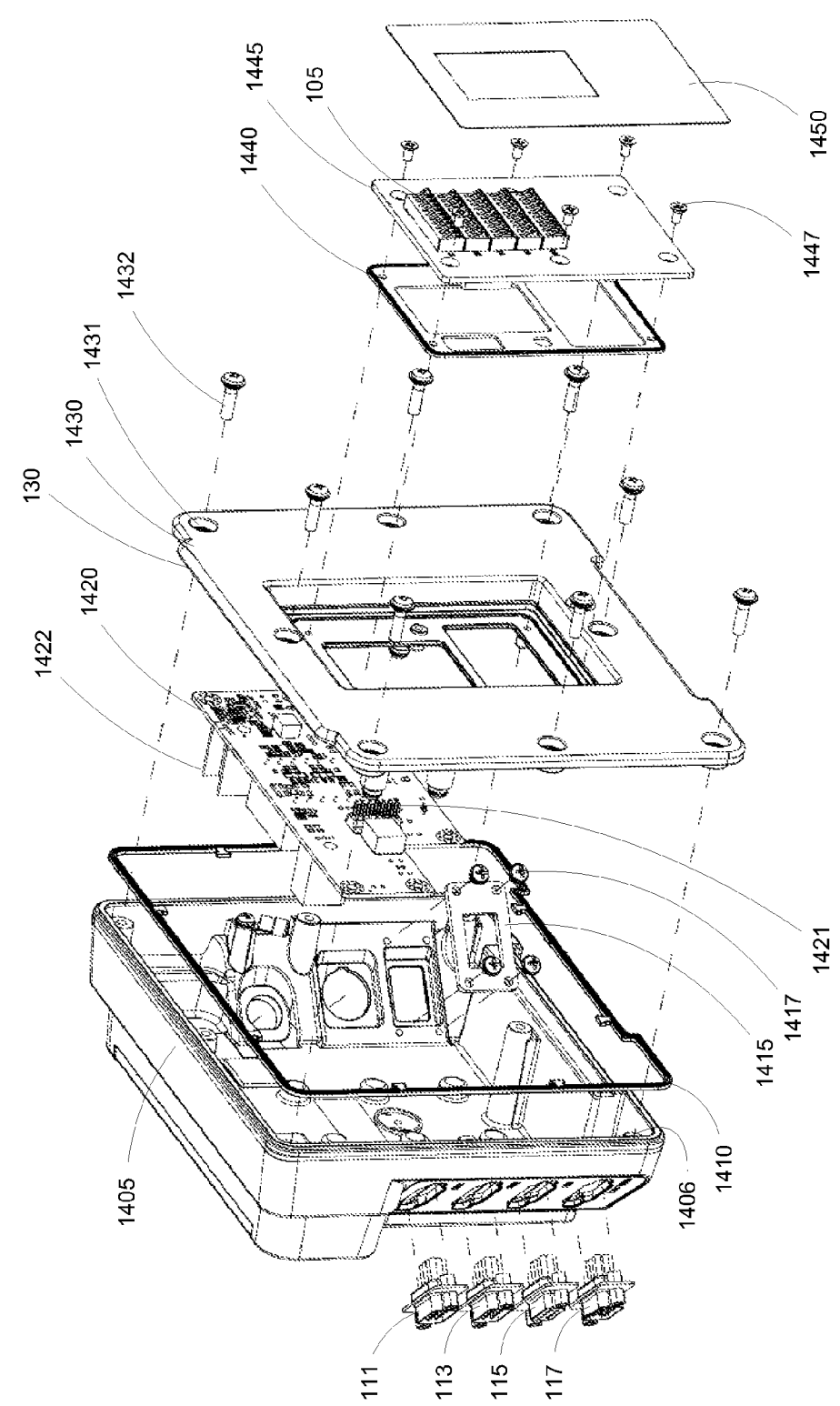
FIG. 14 is an exploded view of the mounting station of FIG. 1, in accordance with certain exemplary embodiments.
Figure 15:
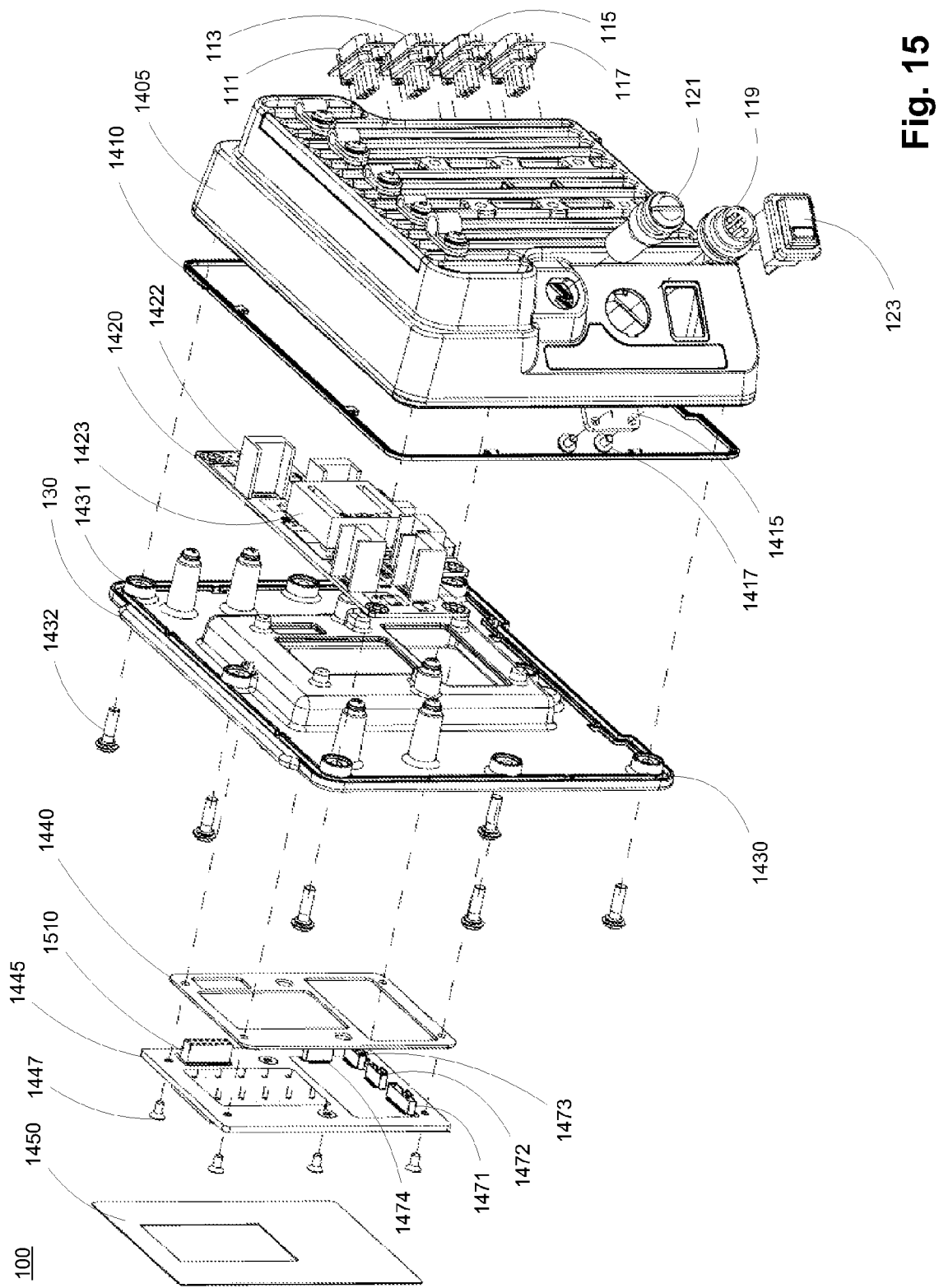
FIG. 15 is an exploded view of the mounting station of FIG. 1, in accordance with certain exemplary embodiments.

FIGS. 14 and 15 are exploded views of the mounting station 100 of FIG. 1, in accordance with certain exemplary embodiments. Referring to FIGS. 14 and 15, the housing 103 of the mounting station 100 includes a rear cover 1405 and a front cover 1430. The rear cover 1405 and the front cover 1430 can be fabricated from any suitable material, including plastic or metal depending on the application. Disposed between the rear cover 1405 and the front cover 1430 is a gasket 1410. The gasket 1410 is optional and forms a seal between the rear cover 1405 and the front cover 1430 that prevents water and dust from entering the housing 103. The front cover 1430 is attached to the rear cover 1405 by screws 1432 that extend through apertures 1431 in the front cover 1430 and engage screw bosses 1406 of the rear cover 1405.

The mounting station 100 also includes a printed circuit assembly ("PCA") 1420 having a power supply 1423 and a multitude of heat sinks 1422 disposed thereon. The power supply 1423 receives supply power from the power input port 119 via one or more electrical conductors (and the power switch 123 and fuse 121) and provides the appropriate amount of power to the computer terminal 150 via the electrical connector 105. In certain alternative embodiments, the power supply 1423 is included with the computer terminal 150 rather than the mounting station 100.

The PCA 1420 also includes an internal power connector 1421. The internal power connector 1421 connects the power supply 1423 to an external power connector 1510 disposed on a second PCA 1445. The external power connector 1510 includes a multitude of "female" plugs for accepting "male" plugs of the internal power connector 1421.

The electrical connector 105 also is disposed on the PCA 1445. At least a portion of the pins 107 of the electrical connector 105 are electrically coupled to the external connector 1510 to route power to the computer terminal 150 when the computer terminal 150 is attached to the mounting station 100. In certain exemplary embodiments, the pins 107 are electrically coupled to the external connector 1510 via strip line conductors on the PCA 1445. The PCA 1445 is attached to the front cover 1430 via screws 1447. An optional gasket 1440 can be disposed between the PCA 1445 and the front cover 1430 to form a seal that prevents water and dust from entering the housing 103. An overlay 1450 covers a portion of the PCA 1445 while leaving the pins 107 of the electrical connector 105 exposed outside the housing 103.

The PCA 1445 also includes several data connectors 1471-1474. Each data connector 1471-1474 receives a data cable (not shown) from one of the communication ports 111-117. In particular, the data connector 1471 is connected to the CAN bus and audio port 117 via a data cable; the data connector 1472 is connected to the serial communication port 111 via a data cable; the data connector 1473 is connected to the serial communication port 113 via a data cable; and the data connector 1474 is connected to the USB port 115 via a data cable. Each data connector 1471-1474 is also electrically coupled to a portion of the pins 107 of the electrical connector 105, for example via strip line conductors.

The mounting station 100 also includes a power switch retention plate 1415 coupled to an interior surface of the rear cover 1405. The power switch retention plate 1415 secures the power switch 121 to the mounting station 100. Although not shown, electrical wiring is routed from the power supply port 119 to the power switch 121. Electrical wiring is also routed from the power switch 121 to the fuse 123 and from the fuse 123 to the power supply 1423.

Referring to FIGS. 1-2 and 14-15, the computer terminal 150 and mounting station 100 can include feedback feature for enabling the mounting station supply power when the computer terminal 150 is properly attached to the mount station 100 only. A power supply enable signal can be routed from the PCA 1420 to the PCA 1445 via connectors 1421, 1510. The power supply enable exits the mounting station 100 via one or more of the electrically conductive pins 107 of the electrical connector 150. The power supply enable enters the computer terminal 150 through one or more of the electrically conductive surfaces 152 of the printed circuit board 151. The power supply enable is looped back on the printed circuit board 151 and takes a reverse path to the PCA 1420 where the power supply enable enables the mounting station power supply 1423.

Figure 24:
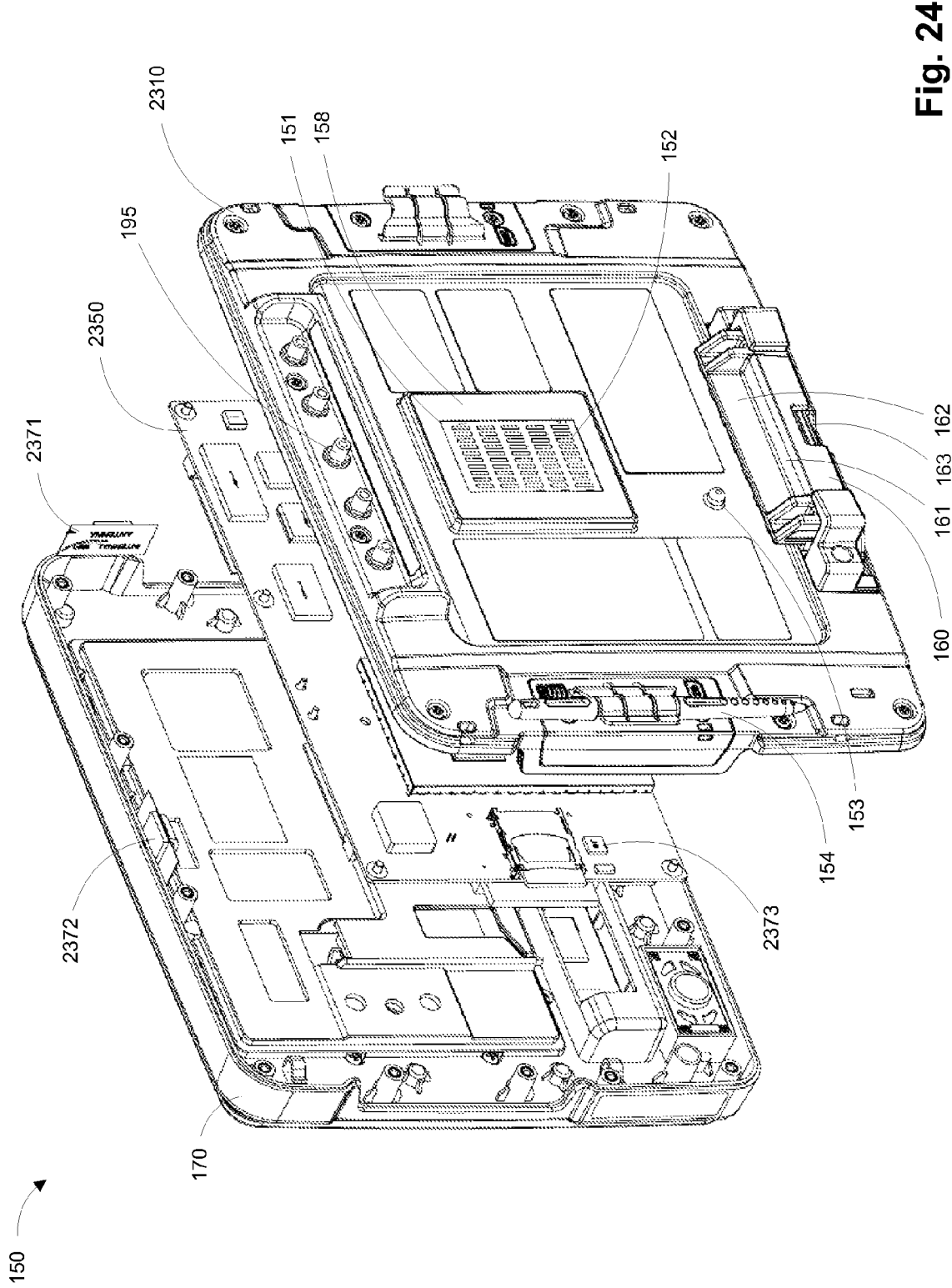
FIG. 24 is an exploded view of the computer terminal of FIG. 1, in accordance with certain exemplary embodiments.

FIGS. 23 and 24 are exploded views of the computer terminal 150 of FIG. 1, in accordance with certain exemplary embodiments. Referring to FIGS. 23 and 24, the computer terminal 150 includes the front panel 170, a circuit board 2350, and a rear panel 2310. The front panel 170 attaches to the rear panel 2310 to provide the housing 190 for the computer terminal's internal components, including the circuit board 2350.

The front panel 170 includes two internal Wi-Fi antennas 2371, 2372 disposed along its perimeter. For example, the Wi-Fi antenna 2371 may be a primary Wi-Fi antenna for the computer terminal 150 and the Wi-Fi antenna 2372 may be an auxiliary Wi-Fi antenna. When the front panel 170 is attached to the rear panel 2310, the Wi-Fi antennas 2371, 2372 are disposed inside the housing 190 and thus, protected from the environment. The Wi-Fi antennas 2371, 2372 can be logically coupled to the network interface 1353 (FIG. 13).

The circuit board 2350 can include one or more communication modules. In particular, the circuit board 2350 includes a wide area network ("WAN") radio module 2361 for communicating with a WWAN, and two Wi-Fi modules 2362, 2363. The Wi-Fi antennas 2371, 2372 are logically coupled to the Wi-Fi modules 2362, 2363, respectively. In addition, the Wi-Fi modules 2362, 2363 are logically coupled to the system bus 1323 (FIG. 13) via the network interface 1353. The circuit board 2350 also can include other types of communication modules, such as Bluetooth and Zigbee communication modules. The circuit board 2350 also includes a compact flash memory card 2369.

Figure 16:
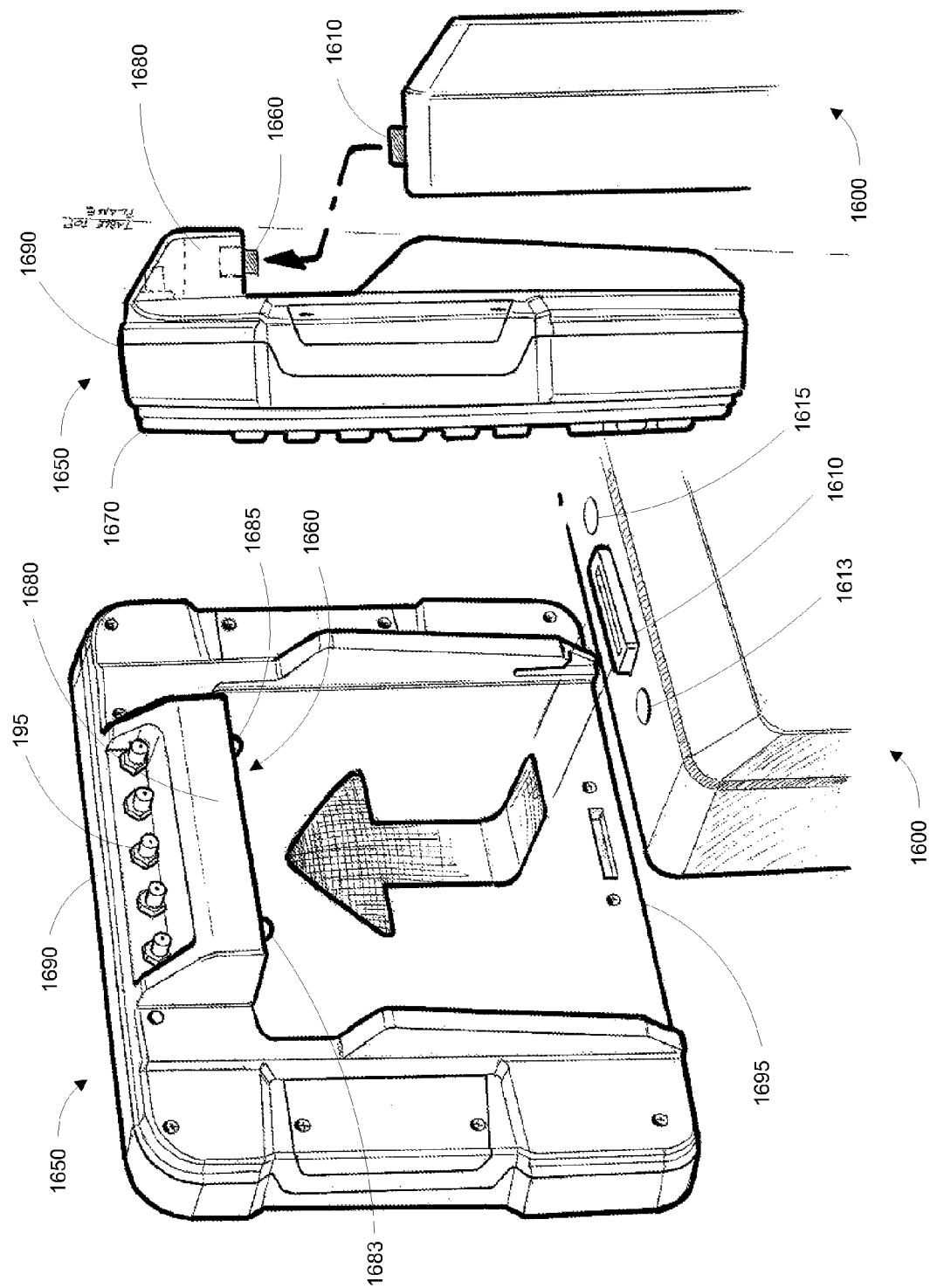
FIG. 16 is a perspective view of a mounting station and a computer terminal removably attachable to the mounting station, in accordance with certain exemplary embodiments.

FIG. 16 is a perspective view of a mounting station 1600 and a computer terminal 1650 removably attachable to the mounting station 1600, in accordance with certain alternative exemplary embodiments. Referring to FIG. 16, the computer terminal 1650 and the mounting station 1600 are similar to the computer terminal 150 and the mounting station 100 of FIGS. 1-15, respectively. However, the mechanical and electrical connections between the computer terminal 1650 and the mounting station 1600 differ from the computer terminal 150 and the mounting station 100. In particular, the exemplary computer terminal 1650 includes a housing 1690 having a flange 1680 that protrudes from the housing's rear surface. The flange 1680 has an electrical connector 1660 that extends from a lower surface of the flange to connect to an electrical connector 1610 of the mounting station 1600 when the computer terminal 1650 is properly attached to the mounting station 1600. The electrical connectors 1610, 1660 route power and data between the mounting station 1600 and the computer terminal 1650, similar to the electrical connector 105 and printed circuit board 151.

The mounting station 1600 and the computer terminal 1650 include several mechanisms for holding the computer terminal 1650 with the mounting station 1600. A first attachment mechanism includes two detents 1613, 1615 disposed along an upper surface of the mounting station 1600. Two protrusions 1683, 1685 are disposed on a lower surface of the flange 1680. The detents 1613, 1615 accept the two protrusions 1683, 1685, respectively, when the computer terminal 1650 is attached to the mounting station 1600. This protrusion-detent connection also helps to align the electrical connectors 1610, 1660 when the computer terminal 1650 is being attached to the mounting station 1600.

A second attachment mechanism includes a locking mechanism (not shown) disposed along a lower surface of the mounting station and a slot 1695 disposed along the bottom of the computer terminal 1650. The locking mechanism can be similar to or substantially the same as the locking mechanism 160 illustrated in FIG. 2 and discussed above. The locking mechanism of the mounting station 1600 can receive the slot 1695 and hold the slot 1695 within the locking mechanism.

A user can attach the computer terminal 1650 to the mounting station 1600 by placing the computer terminal 1650 on the mounting station 1600 such that the protrusions 1683, 1685 enter the detents 1613, 1615. The user can then press the bottom of the computer terminal 1650 against the bottom of the mounting station 1600 until the slot 1695 is locked into place within the locking mechanism. The user can remove the computer terminal 1650 from the mounting station 1600 by releasing the slot 1685 from the locking mechanism (e.g., via a lever 163). The user can then lift the computer terminal 1650 from the mounting station 1600.

Figure 17:
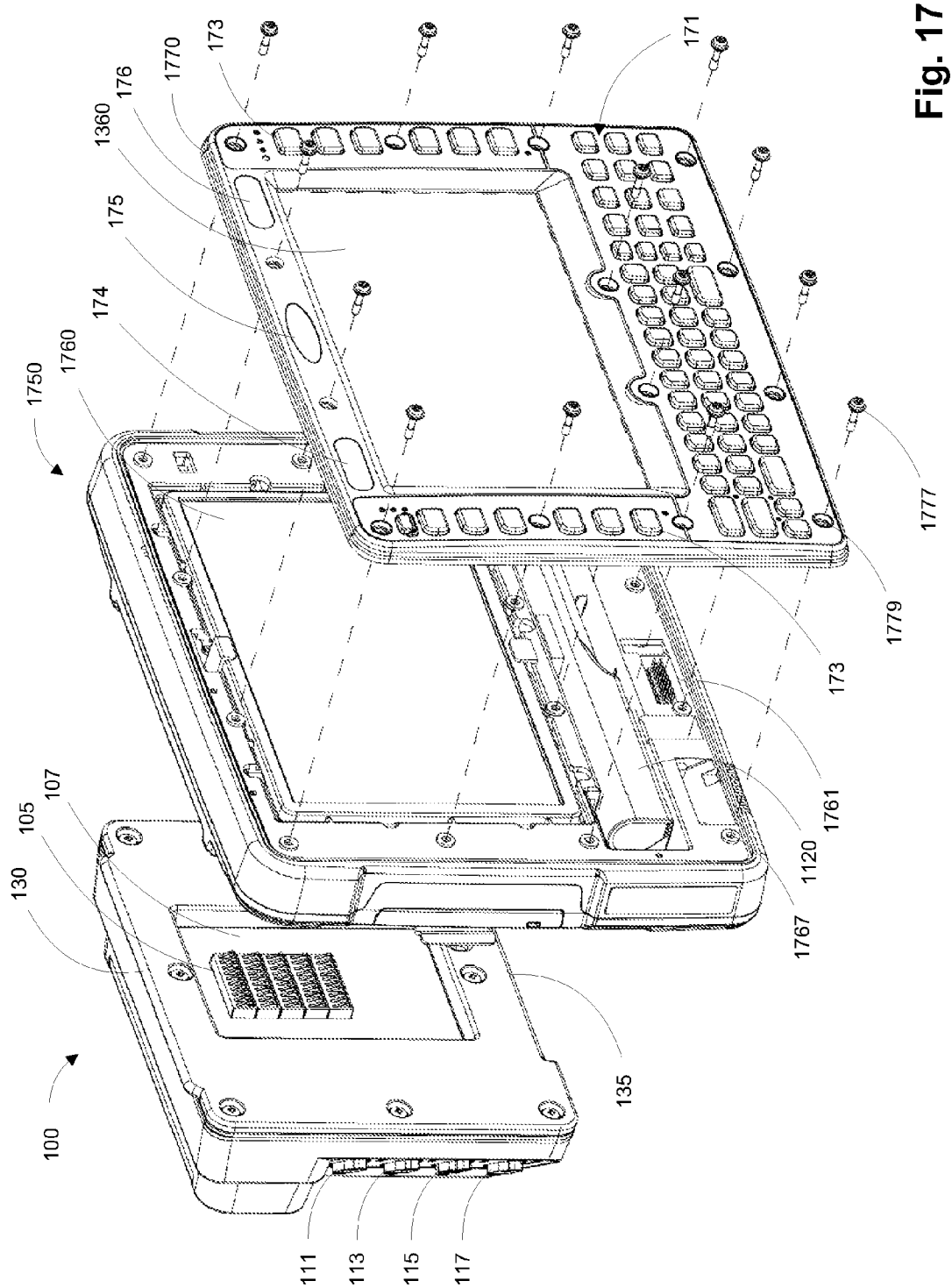
FIG. 17 is a perspective view of a mounting station and a computer terminal removably attachable to the mounting station and having a removable front panel, in accordance with certain exemplary embodiments.
Figure 18:
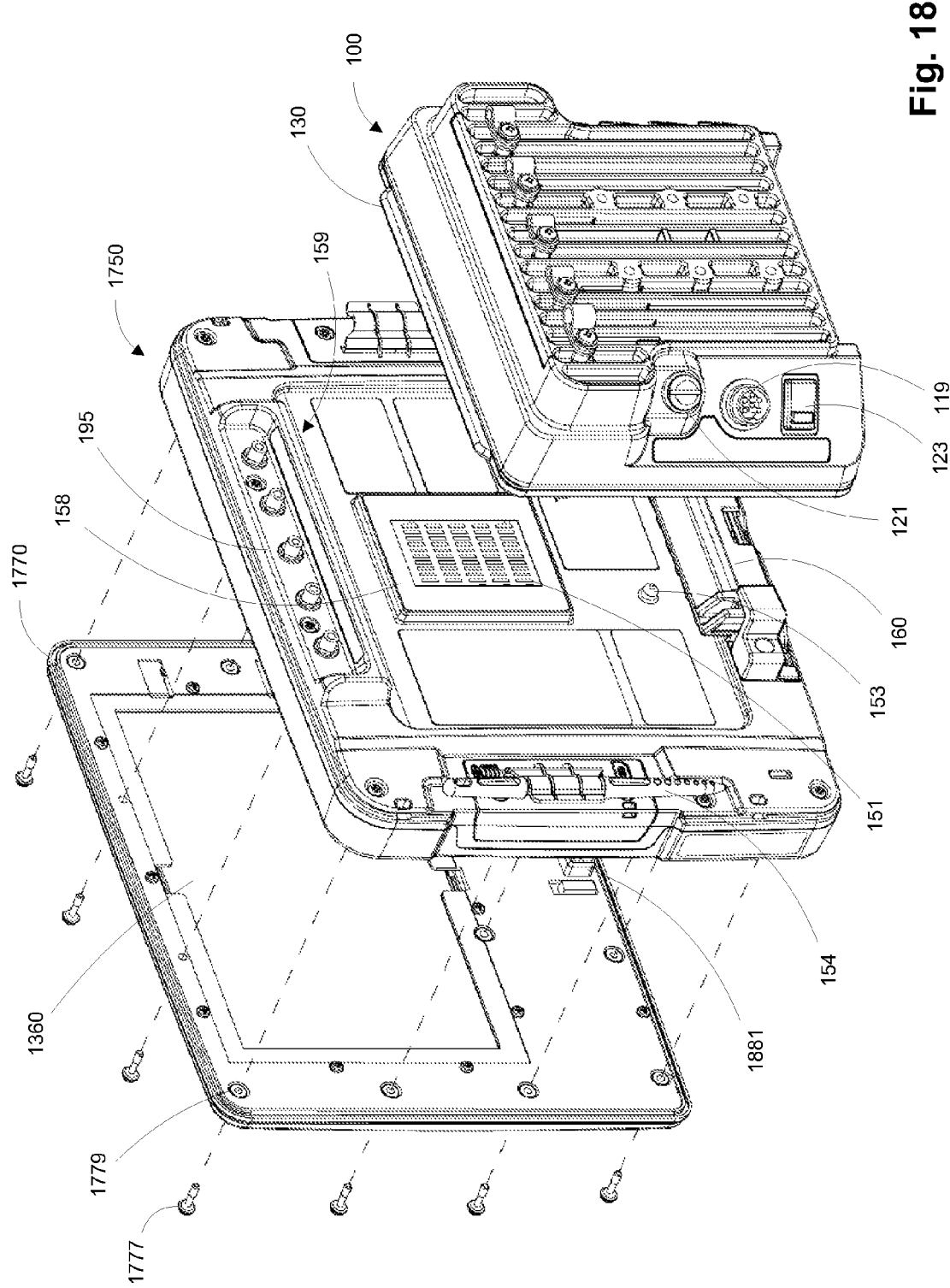
FIG. 18 is a perspective view of the mounting station and the computer terminal of FIG. 17, in accordance with certain exemplary embodiments.
Figure 20:
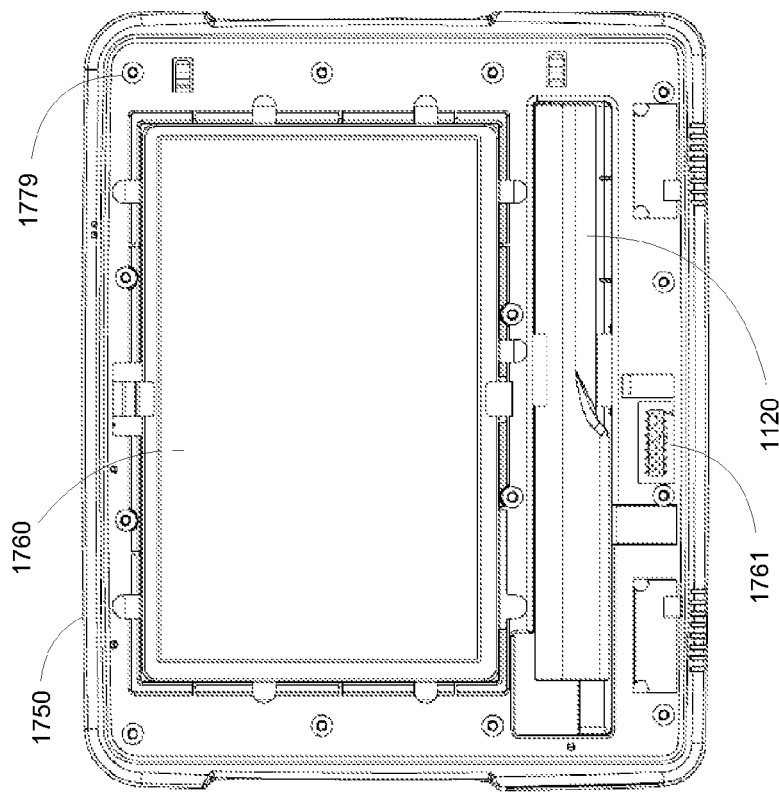
FIG. 20 is a front elevation view of the computer terminal of FIG. 17 with the front panel removed, in accordance with certain exemplary embodiments.
Figure 19:
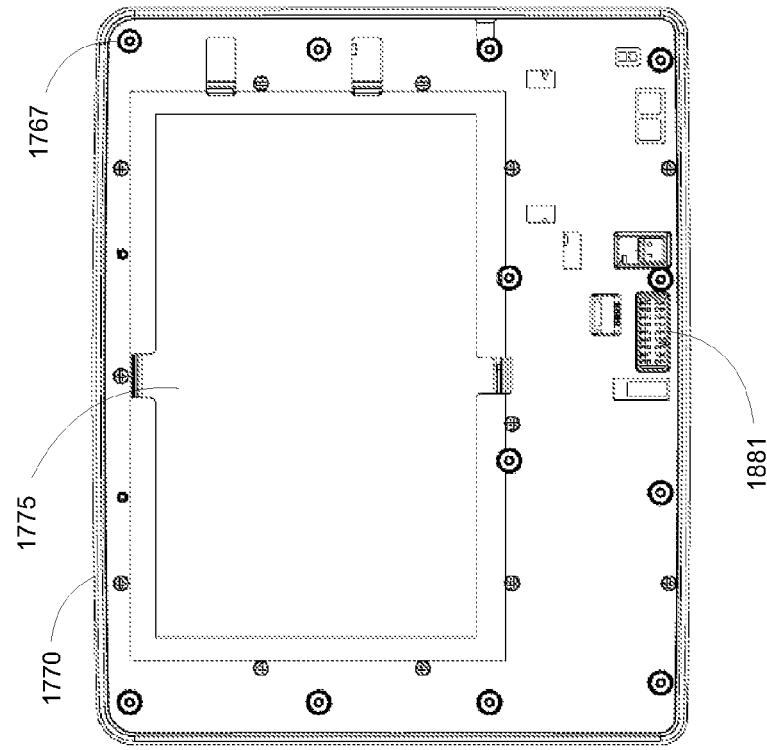
FIG. 19 is a rear elevation view of the front panel of FIG. 17, in accordance with certain exemplary embodiments.

FIGS. 17-20 depict the mounting station 100 and a computer terminal 1750 having a removable front panel 1770. In particular, FIGS. 17 and 18 are perspective views of the mounting station 100 and the computer terminal 1750 with the computer terminal 1750 detached from the mounting station and the front panel 1770 detached from the computer terminal 1750; FIG. 19 is a rear elevation view of the front panel 1770; and FIG. 20 is a front elevation view of the computer terminal 1750 with the front panel 1770 removed.

Figure 21:
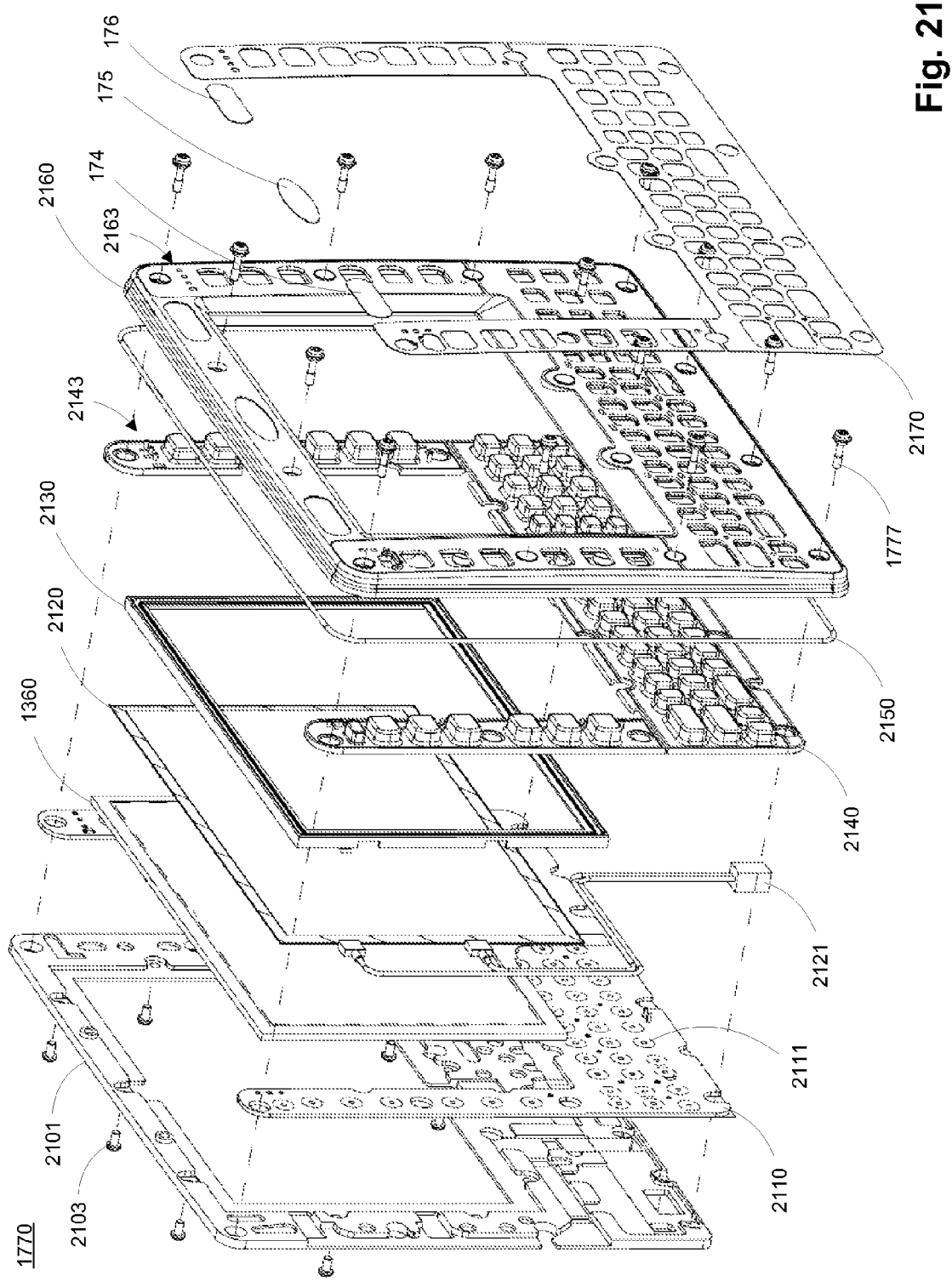
FIG. 21 is an exploded view of the front panel of FIG. 17, in accordance with certain exemplary embodiments.

Referring to FIGS. 17-20, the removable front panel 1770 includes the user interface components of the computer terminal 1750. In particular, the removable front panel 1770 includes the touch sensitive screen 1360, the user configurable keys 173, and the keypad 171. The touch sensitive screen 1360, the user configurable keys 173, and the keypad 171 are each electrically coupled to the computer terminal 1750 via an electrical connector 1881 (FIG. 18) disposed on the rear surface of the front panel 1770 and an electrical connector 1761 disposed on the computer terminal 1750. That is, when the front panel 1770 is properly attached to the computer terminal 1750, the electrical connector 1761 engages the electrical connector 1881 to provide an electrical and logical connection between the components 171, 173, 1360 of the front panel 1770 and components of the computer terminal 1750. In particular, the electrical connectors 1761, 1881 provide connections between the keypad 171 and the serial port interface 1346; between the user configurable keys 173 and the serial port interface 1346; and between the touch sensitive screen 1360 and the touch screen controller 1361. In addition, the electrical connectors 1761, 1881 route power from the computer terminal 1750 to a defroster 2121 (FIG. 21).

In typical work environments, touch sensitive screens 1360 and keypads 171 have higher failure rates than other components of the computer terminal 1750. These high failure rates are often caused by operator misuse. For example, operators may pick at the keys of the keypad 171 during idle times and cause the keys to fall from the front panel 1770. In addition, operators often use tools, such as screwdrivers, to interact with touch sensitive screen 1360 and keypads 171. The use of tools rather than fingers can damage the touch sensitive screen 1360 and the keypad 171. By having the higher failure rate components on a removable front panel 1770, when one of these components fail, a user can replace the front panel 1770 only without taking the entire computer terminal 1750 out of service. This can lead to reduced downtime and also to reduced maintenance costs.

Figure 22:
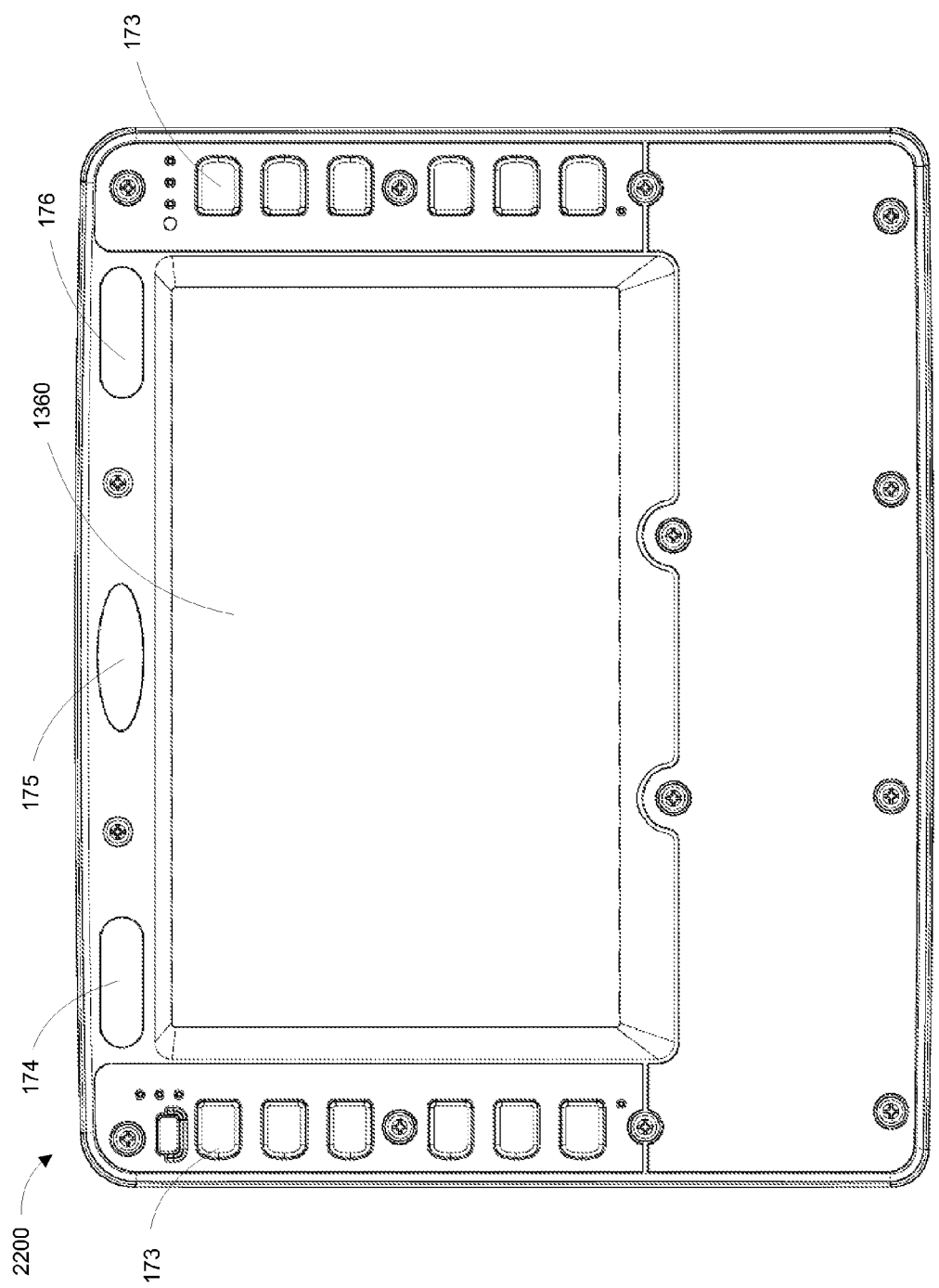
FIG. 22 is an elevation view of a front panel of a computer terminal, in accordance with certain exemplary embodiments.

In addition to maintenance and cost advantages, having a removable front panel 1770 simplifies rebranding a computer terminal 1750 as the labels 174-176 are on the removable front panel 1770. Yet another advantage of the removable front panel 1770 is the ability to change the user interface based on operator. For example, FIG. 22 is an elevation view of a front panel 2200 of a computer terminal 1750, in accordance with certain exemplary embodiments. Referring to FIG. 22, the exemplary front panel 2200 includes the touch sensitive screen 1360 and the user configurable keys 173. However, the front panel 2200 does not include a keypad 171. In certain other alternative embodiments, a front panel may include a keypad 171 only, without a touch sensitive screen 1360 or user configurable keys 173. Some operators may be qualified to use front panels having certain user interface components while other operators are not. In such situations, the front panel 1770 can be replaced based on operator without having to replace the entire computer terminal 1750.

Referring back to FIGS. 17-20, the computer terminal 1750 can include an application module 1336 (or hardware) that can detect the front panel 1770 and determine what user interface components the front panel 1770 includes. In certain exemplary embodiments, the keypad PCA 2110 (FIG. 21) includes a microcontroller or other device that detects the front panel configuration. A resistor selection on an input to the microcontroller can be used to select the type of keypad 171 included on the front panel 107. In addition, a current sense input of the microcontroller can be used to detect the presence of the defroster 2120 (FIG. 21). The microcontroller can transmit information regarding the front panel 1770 to the computer terminal 1750, for example by way of serial communication.

In the illustrated embodiment, the front panel 1770 is attached to the computer terminal 1750 via a multitude of screws 1777 that extend through apertures 1779 in the front panel 1770 and engage screw bosses 1767 of the computer terminal 1750. The front panel 1770 can be removed from the computer terminal 1750 by removing the screws 1777 and pulling the front panel 1770 away from the computer terminal 1750. Other types of hardware and attachment mechanisms can also be used in place of screws 1777 to attach the front panel 1770 to the computer terminal 1750.

FIG. 21 is an exploded view of the front panel 1770 of FIG. 17, in accordance with certain exemplary embodiments. Referring to FIG. 21, the exemplary front panel 1770 includes a bracket 2101 and a front bezel 2160 that form a housing for components of the front panel 1770. The bracket 2101 is attached to the front bezel 2160 via a multitude of screws 2103. In certain exemplary embodiments, the bracket 2101 and front bezel 2160 are made of a plastic material. Disposed between the bracket 2101 and the front bezel 2160 are a keypad PCA 2110, the touch sensitive screen 1360, an optional front panel heater or defroster 2120, a touch screen gasket 2130, a keypad 2140 that includes the keypad 171 and the user configurable keys 173, and a keypad bezel gasket 2150. In certain exemplary embodiments, the keypad 2140 is an elastomeric keypad.

The keypad PCA 2110 is electrically coupled to the electrical connector 1881 such that the keypad PCA 2110 communicates with the serial port interface 1346 when the front panel 1770 is properly installed on the computer terminal 1750. The keypad PCA 2110 includes pads 2111 for each key of the keypad 171 and for each user configurable key 173. The pads 2111 are operable to detect when a key of the keypad 171 or one of the user configurable keys 173 are depressed and communicates this detection to the serial port interface 1346, and ultimately to the processing unit 1321. Similarly, the touch sensitive screen 1360 is electrically coupled to the electrical connector 1881 via one or more electrical conductors to communicate with the touch screen controller 1361.

The front panel defroster 2120 is operable to clear condensation from the touch sensitive screen 1360. The front panel defroster 2120 can include a local power source 2121 such as a battery, or receive power from the computer terminal 1750 via the electrical connectors 1761, 1881.

Referring to FIGS. 17-21, the computer terminal 1750 is suitable for use in harsh environments. When the front panel 1770 is properly attached to the computer terminal 1750, the internal components of the computer terminal 1750 and the front panel 1770 are protected from water, dust, and other elements of the environment. A seal is formed between the front panel 1770 and the computer terminal 1750 by compressing the front panel gasket 2150 between the two assemblies. The front panel 1770 includes additional environmental sealing provided by the elastomeric keypad 2140. The keypad's elastomer forms a seal to prevent water and dust from entering the key holes on front bezel 2160. This seal is achieved by compressing the elastomeric keypad 2140 between the front bezel 2160 and the keypad PCA 2110. This compression comes from attaching the front bezel 2160 to the bracket 2101 by tightening the screws 2103.

The overlays 2170 also act as a sealing material over holes 2163 in the front bezel 2160 for light emitting diodes ("LEDs") 2143. An adhesive on the overlays 2170 adheres to the front bezel 2160 sealing the holes 2163. The touch screen gasket 2130 seals the opening in the front bezel 2160 for the touch sensitive screen 1360. The touch screen gasket 2130 is compressed between the touch sensitive screen 1360 and the front bezel 2160 when the gasket 2101 is attached to the front bezel 2160 by the screws 2103.

The self contained construction of the front panel 1770 with a keyed installation (i.e., only attached to the computer terminal 1750 one way) and no user accessible cables, makes errors in user installation of the front panel 1770 to the computer terminal 1750 negligible, therefore maintaining stability of the ruggedized system. In certain exemplary embodiments, the only cables present in the front panel 1770 are for the touch sensitive screen 1360 and the optional defroster 2120. These cables also can be self contained within the front panel assembly connecting to the PCA 2110 and may not be accessible to users in certain exemplary embodiments. The act of installing the front panel 1770 on the computer terminal 1750 makes the appropriate connections for the user and creates a water and dust proof seal around the connectors 1761, 1881 and electronic components.

The screw bosses and circuit board layout also has been constructed in such a way as to protect the keypad PCA 2110 and internal electronics from static discharge. Design elements are incorporated that isolate and shunt electronic discharge ("ESD") away from sensitive components integrated within the front panel 1770. In certain exemplary embodiments, the externally conductive screws of the front panel 1770 are isolated with sufficient clearance from all conductive nets of the keypad PCA 2110. In certain exemplary embodiments, externally exposed conductive surfaces that make functional connections to the keypad PCA 2110, such as the touch sensitive screen 1360 and the front panel defroster 2120 have passive protective components that shunt fast rising transitions characteristic of ESD to ground.

One of ordinary skill in the art would appreciate that the present invention provides a computer mounting system for quickly attaching and detaching a computer terminal from a mounting station. The mounting station can be semi-permanently attached to an object, such as on forklift or a non-mobile structure, such as a wall. The mounting station can include a power input port for receiving external power for the computer terminal and one or more communication ports for providing data communication between the computer terminal and another device. The computer terminal includes an electrical connector that engages an electrical connector of the mounting station to receive the supply power and facilitate the data communication between the computer terminal and other device. The computer terminal and/or the mounting station can include a locking mechanism that releasably couples the computer terminal to the mounting station such that the electrical connectors maintain proper contact.

Although specific embodiments have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A mounting station for releasably holding a computer terminal, comprising:
    a housing comprising a first surface, a second surface, and an attachment mechanism disposed on the first surface for attaching the mounting station to a structure;
    a power input port disposed along the housing for receiving supply power for the computer terminal;
    an electrical connector electrically coupled to the power input port and comprising a plurality of electrically conductive members disposed in an indentation of the second surface, the indentation for receiving a raised surface of the computer terminal comprising a plurality of electrically conductive elements;
    a tab disposed along an upper edge of the second surface for engaging a slot disposed on an upper surface of the computer terminal to align each electrically conductive member with a respective electrically conductive element of the plurality of electrically conductive elements; and
    a ridge disposed along a lower edge of the second surface for engaging a locking mechanism of the computer terminal to securely attach the computer terminal to the mounting station,
    wherein each of the plurality of electrical conductive members contact the respective electrically conducive element when the computer terminal is properly attached to the mounting station.

2. The mounting station of claim 1, wherein the attachment mechanism comprises a ball-shaped coupler for coupling to a socket coupler of the structure.

3. The mounting station of claim 1, wherein the housing comprises an alignment notch disposed on the second surface for receiving an alignment pin disposed on the computer terminal.

4. The mounting station of claim 1, further comprising at least one data communication port disposed along the housing for receiving a data communication cable, wherein the at least one data communication port is logically coupled to the electrical connector.

5. The mounting station of claim 4, wherein the electrically conductive members are disposed in a plurality of rows and wherein the electrically conductive members of one of the rows are electrically coupled to the power input port such that during attachment of the computer terminal to the mounting station, the electrically conductive members of the one row contact respective electrically conductive elements prior to electrically conductive members logically coupled to the at least one data communication port contact with respective electrically conductive elements.

6. A computer terminal, comprising:
a housing comprising a front surface and a rear surface;
at least one attachment mechanism disposed on the rear surface for releasably attaching the computer terminal to a mounting station;
a front panel disposed on the front surface and comprising a display;
a processor disposed within the housing and logically coupled to the display;
an electrical connector comprising a plurality of electrically conductive elements logically coupled to the processor and disposed on a raised area of the rear surface for engaging an indentation of the mounting station comprising a plurality of electrically conductive elements;
wherein the attachment mechanism is operable to attach the computer terminal to the mounting station such that each of the electrically conductive elements contacts a corresponding electrically conductive member of the mounting station.

7. The computer terminal of claim 6, wherein the rear surface comprises a slot for receiving a tab of the mounting station.

8. The computer terminal of claim 6, wherein the at least one attachment mechanism comprises a spring loaded locking mechanism for receiving a ridge of the mounting station and securely holding the ridge within the locking mechanism.

9. The computer terminal of claim 8, wherein the locking mechanism comprises a latch actuatable to release the ridge from the locking mechanism and thereby release the computer terminal from the mounting station.

10. The computer terminal of claim 6, wherein the rear surface comprises an alignment pin for engaging an alignment notch of the mounting station.

11. The computer terminal of claim 6, wherein the front panel is removably attached to the computer terminal.

12. A system, comprising:
a mounting station for releasably holding a computer terminal and providing supply power to the computer terminal, the mounting station comprising:
a first housing comprising a first surface, a second surface, and an attachment mechanism for attaching the mounting station to another object;
a power input port disposed along the first housing for receiving supply power for the computer terminal;
a first electrical connector electrically coupled to the power input port and comprising a plurality of electrically conductive members disposed in an indentation of the second surface;
a tab extending from an upper edge of the second surface; and
a ridge disposed along a lower edge of the second surface;
the computer terminal comprising:
a second housing comprising a front surface and a rear surface;
at least one attachment mechanism disposed on the rear surface for releasably engaging the ridge;
a front panel disposed on the front surface and comprising a display;
a processor disposed within the second housing and logically coupled to the display;
a second electrical connector comprising a plurality of electrically conductive elements logically coupled to the processor and disposed on a raised area of the rear surface for engaging the indentation; and
a slot for receiving the tab,
wherein each of the plurality of electrical conductive members contact a corresponding electrical conductive element when the computer terminal is attached to the mounting station.

13. The system of claim 12, wherein the mounting station further comprises at least one data communication port disposed along the first housing for receiving a data communication cable, wherein the at least one data communication port is logically coupled to the first electrical connector.

14. The system of claim 13, wherein the processor is logically coupled to a device connected to the at least one data communication port via the first electrical connector and the second electrical connector when the computer terminal is attached to the mounting station.

15. The system of claim 12, wherein the first housing and the second housing each comprise waterproof housings.

16. The system of claim 12, wherein the at least one attachment mechanism comprises a locking mechanism for receiving the ridge of the first housing and securely holding the ridge within the locking mechanism.

17. The system of claim 16, wherein the locking mechanism comprises a latch actuatable to release the ridge from the locking mechanism and thereby release the computer terminal from the mounting station.

18. The system of claim 12, wherein the rear surface comprises an alignment pin for engaging an alignment notch disposed on the first housing.

19. The system of claim 12, wherein the rear surface comprises an alignment notch for accepting an alignment pin disposed on the first housing.

20. The system of claim 12, wherein the front panel is removable from the computer terminal.

* * * * *